United States Patent
Bhide

(10) Patent No.: US 9,268,755 B2
(45) Date of Patent: Feb. 23, 2016

(54) PERFORMING PERSISTENT UNDO AND REDO OPERATION WITHIN COMPUTER SOFTWARE

(71) Applicant: Shashank Bhide, Willoughby, OH (US)

(72) Inventor: Shashank Bhide, Willoughby, OH (US)

( * ) Notice: Subject to any disclaimer, the term of this patent is extended or adjusted under 35 U.S.C. 154(b) by 169 days.

(21) Appl. No.: 14/195,225

(22) Filed: Mar. 3, 2014

(65) Prior Publication Data

US 2014/0258228 A1    Sep. 11, 2014

Related U.S. Application Data

(60) Provisional application No. 61/773,200, filed on Mar. 6, 2013.

(51) Int. Cl.
*G06F 17/30* (2006.01)
*G06F 17/24* (2006.01)
*G06F 17/22* (2006.01)

(52) U.S. Cl.
CPC ............ *G06F 17/24* (2013.01); *G06F 17/2288* (2013.01); *G06F 17/30321* (2013.01); *G06F 17/30345* (2013.01); *G06F 17/30613* (2013.01)

(58) Field of Classification Search
CPC ............... G06F 17/30613; G06F 17/30321; G06F 17/30345
See application file for complete search history.

(56) References Cited

U.S. PATENT DOCUMENTS

| | | | | |
|---|---|---|---|---|
| 5,524,205 A | * | 6/1996 | Lomet | G06F 11/1471 711/161 |
| 6,543,006 B1 | * | 4/2003 | Zundel | G06F 11/141 714/15 |
| 6,618,851 B1 | * | 9/2003 | Zundel | G06F 17/50 711/156 |
| 2011/0106776 A1 | * | 5/2011 | Vik | G06F 9/4443 707/698 |
| 2013/0117238 A1 | * | 5/2013 | Gower | G06F 11/1412 707/684 |
| 2014/0136473 A1 | * | 5/2014 | Faerber | G06F 17/30315 707/607 |
| 2014/0136788 A1 | * | 5/2014 | Faerber | G06F 17/30315 711/133 |

* cited by examiner

*Primary Examiner* — Leslie Wong
(74) *Attorney, Agent, or Firm* — Howard M. Cohn; Daniel Cohn

(57) ABSTRACT

A method and apparatus for managing persistent change operations on user data is disclosed. For each change, a record of the change is saved. An index tracks the current state of the user data. Changes can be undone or redone in a sequential manner if certain criteria are met. Variables pertaining to the changes are saved in a persistent storage, enabling an undo/redo history to be preserved if a program is exited and restarted.

21 Claims, 33 Drawing Sheets

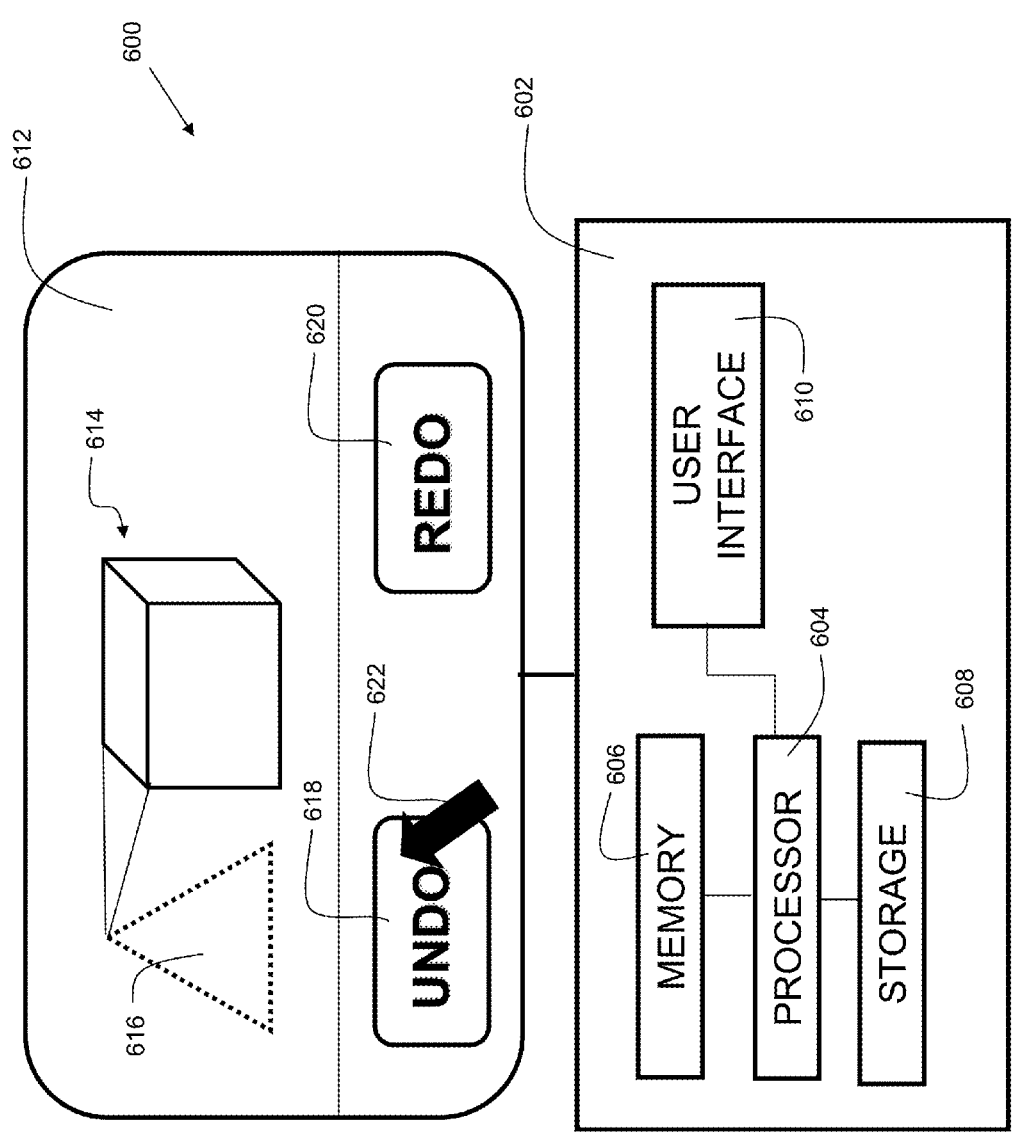

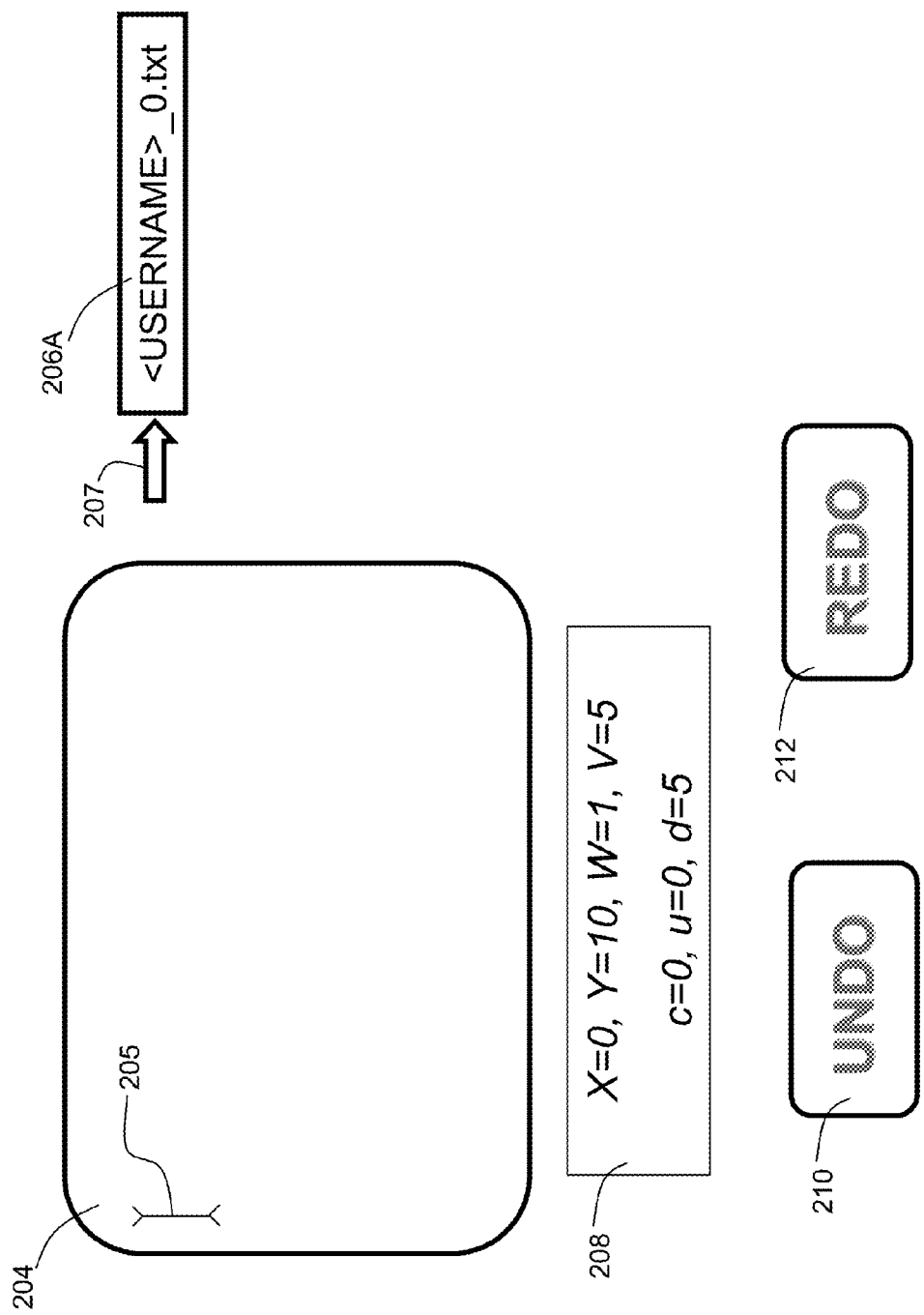

PERFORMING PERSISTENT UNDO AND REDO OPERATION WITHIN COMPUTER SOFTWARE

This non-provisional application claims the benefit of the provisional application filed with the United States Patent and Trademark Office as Application No. 61/773,200 entitled PERFORMING PERSISTENT UNDO AND REDO OPERATION WITHIN COMPUTER SOFTWARE, filed Mar. 6, 2013.

TECHNICAL FIELD OF THE INVENTION

The present invention relates generally to the capture and subsequent retrieval of data and changes made to the data.

BACKGROUND OF THE INVENTION

Nowadays, there are many types of software application where the user of that application is able to save data or information in any format through that application. In a conventional scenario, software dealing with user data provides functionality for undoing or redoing the changes the user makes to the data, but the record of the said changes is lost once the software application exits or the machine goes offline. It is therefore desirable to have improvements in the management of redo and undo operations.

SUMMARY OF THE INVENTION

Accordingly, it would be beneficial to provide a method for allowing the application to write/save the record of the changes done to user data so that previous states of this data are available and can be accessed and restored by undoing or redoing these changes at any time in the future regardless of the state of the concerned software application or the machine.

In a first aspect, embodiments of the present invention provide method of performing a persistent change operation to user data, comprising: establishing a current index value for user data; establishing a undo limit value; establishing a redo limit value; establishing an increment/decrement value; receiving a request to modify user data; saving a backup copy of the user data corresponding to the current index value; applying the request to modify user data to create a modified copy of the user data; saving the modified copy of the user data; incrementing the current index value by the increment/decrement value to create a new current index value; and saving a backup copy of the user data corresponding to the new current index value.

In a second aspect, embodiments of the present invention provide a system for performing persistent change operation to user data, comprising: a memory configured and disposed to store machine instructions; a processor configured and disposed to access the memory; a user interface device configured and disposed to receive user input; a display configured and disposed to render the user data; wherein the memory contains instructions, which when executed by the processor, perform steps of: establishing a current index value for user data; establishing a undo limit value; establishing a redo limit value; establishing an increment/decrement value; receiving a request to modify user data; saving a backup copy of the user data corresponding to the current index value; applying the request to modify user data to create a modified copy of the user data; saving the modified copy of the user data; incrementing the current index value by the increment/decrement value to create a new current index value; and saving a backup copy of the user data corresponding to the new current index value.

In a third aspect, embodiments of the present invention provide a computer program product embodied in a non-transitory computer readable medium for implementation of an apparatus for performing persistent change operations on user data, comprising instructions for: establishing a current index value for user data; establishing a undo limit value; establishing a redo limit value; establishing an increment/decrement value; receiving a request to modify user data; saving a backup copy of the user data corresponding to the current index value; applying the request to modify user data; saving the modified copy of the user data to create a modified copy of the user data; incrementing the current index value by the increment/decrement value to create a new current index value; and saving a backup copy of the user data corresponding to the new current index value.

BRIEF DESCRIPTION OF THE DRAWINGS

Presently preferred embodiments are shown in the drawings. It should be appreciated, however, that the invention is not limited to the precise arrangements and instrumentalities shown.

FIG. 8a-8d depict block diagrams of a system in accordance with embodiments of the present invention.

FIGS. 9a-9m show examples of Undo/Redo operations.

DETAILED DESCRIPTION OF THE INVENTION

Figure 1A:
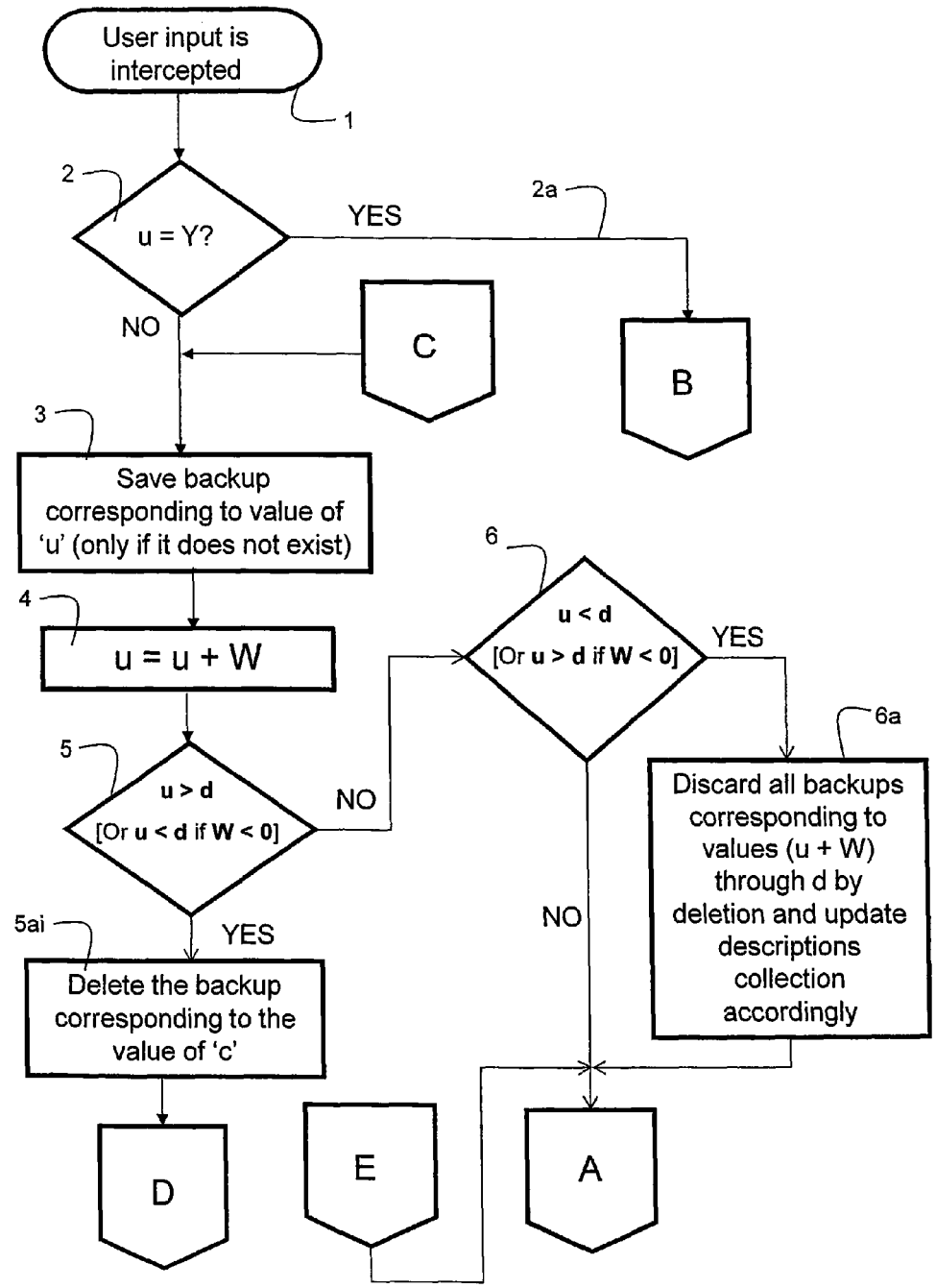
FIGS. 1a-1d depict a flowchart highlighting the steps taken to save backup copies while recording changes to the data
Figure 1B:
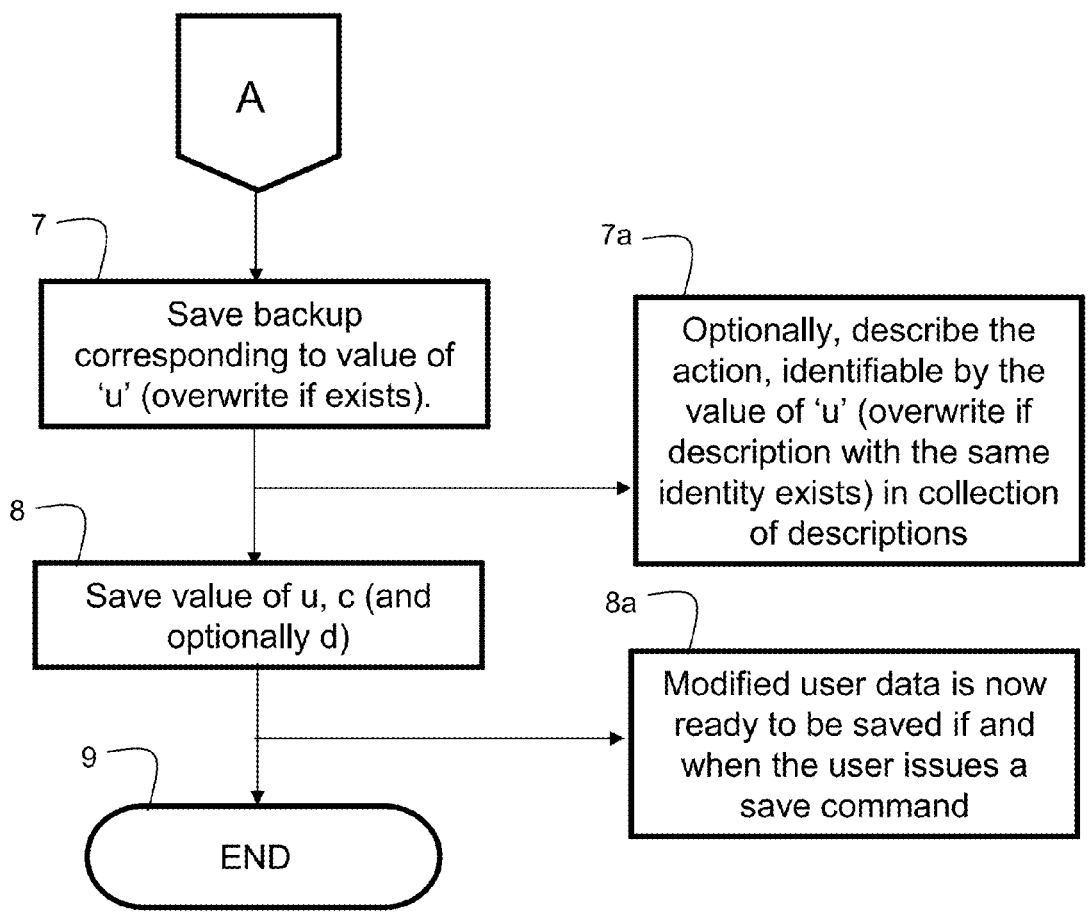
Figure 1C:
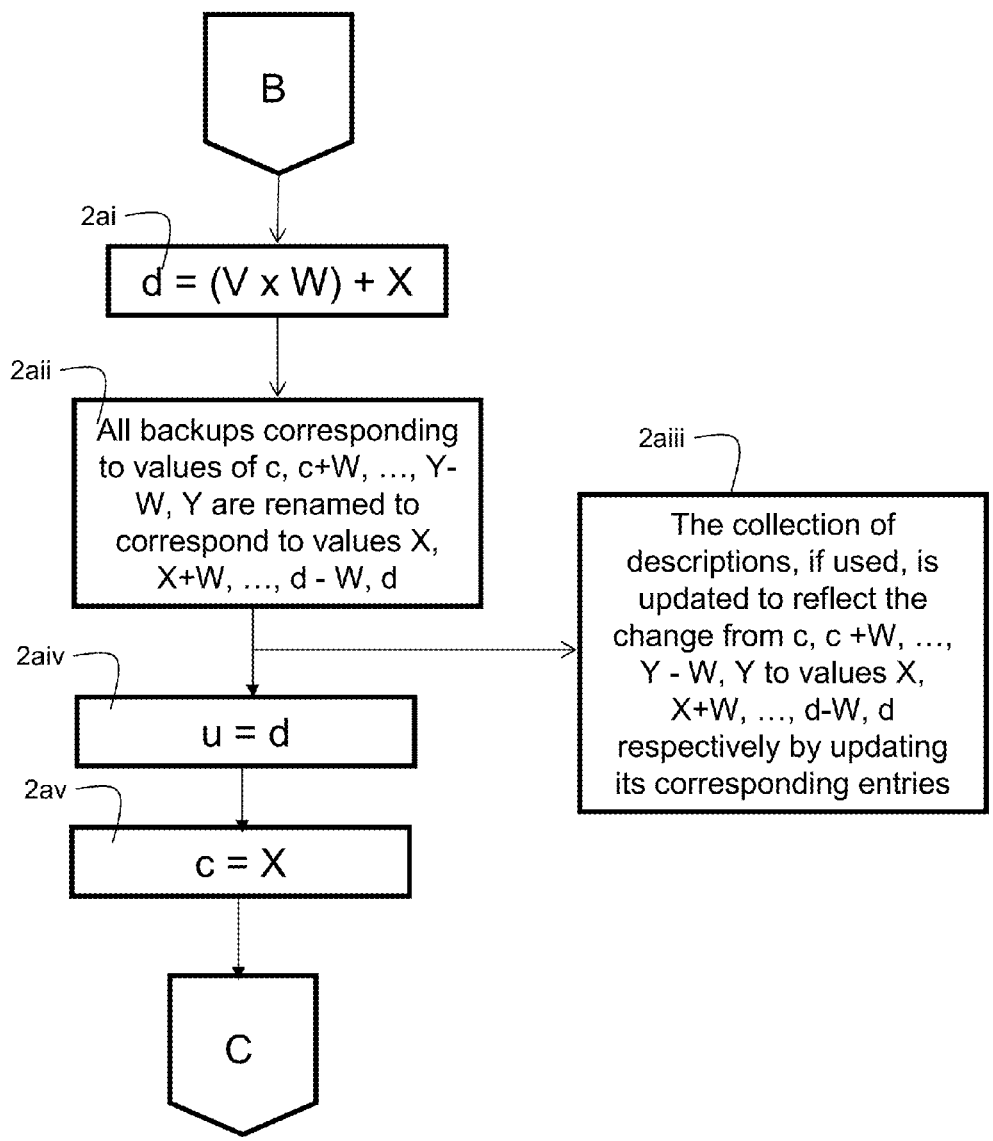
Figure 1D:
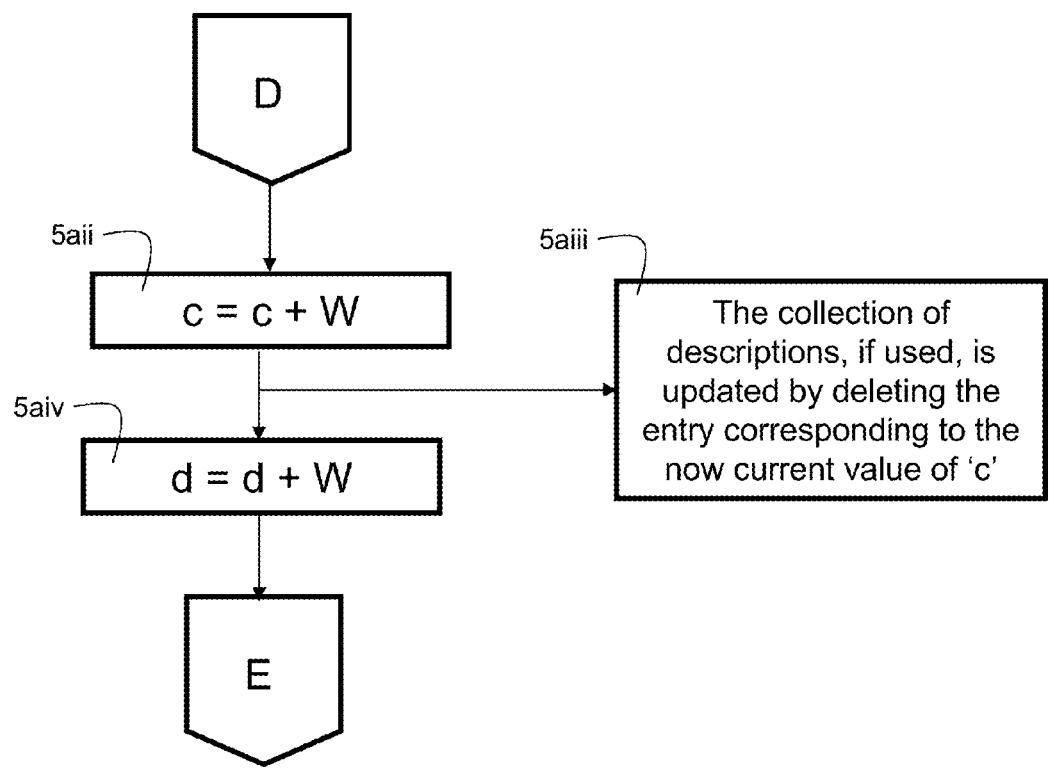

Although described throughout this document as including method steps, those of skill in the art will recognize that any number of different arrangements of steps can produce the outcome of the presently claimed method. The means of creating such steps can include various software, computers, processors, computer networks, and data devices such as non-transient memories or non-transitory memories, or other suitable computer readable medium.

The majority of computer programs will save user data that is selected by the user via a save command. However, sometimes, a computer program will end, either through a power failure or through the action of a user. In any such case although the user data might be saved by the program, the record of changes the user data went through are not preserved by the program.

Although some computer programs do provide data recovery options, their technique is limited with regards to sequential recovery of previous states of the data. For example, some computer games and/or operating systems might save backup copies of the data that are available after the application exits or the system or machine goes offline, but they only allow the data to be restored by selecting a specific backup. These systems do not allow the backups to be restored in a sequential manner akin to conventional undo and redo functionality.

Note that for all mathematical formulas contained herein, the BODMAS mathematical rules apply, including performing operations within brackets/parenthesis first, followed by handling order operations (i.e. Powers and Square Roots, etc.), followed by division and multiplication (left-to-right), followed by addition and subtraction (left-to-right).

Accordingly, the below described method provides steps for achieving this goal using an open ended approach. As described below, the presently claimed method illustrates but one possible method for achieving this goal. Several variations may be apparent to those of skill in the art, but each stems from the inventive concepts disclosed herein. In the following description, the terms method and technique are used interchangeably.

The open ended technique described herein uses the term 'backup' to denote either the entire data or the change made to the data [change will be that which when combined with the unmodified data will give the modified data and vice versa]. It is also up to the application to decide what a change is, so that it can save backups accordingly. For example, a word processing application may define change as each typed character, word, line, paragraph or a combination of any of these. This technique involves maintaining three variables. The first is the index of the current state of the user data (variable 'u', referred to as a current index value), second is the index beyond which the changes to the data cannot be undone (variable 'c', referred to as an undo limit value) and the third is the index beyond which the changes to the data cannot be redone (variable 'd', referred to as a redo limit value). The application decides the outer bounds of the values that can be assigned to variables 'u', 'c' and 'd'. Calling the outer bounds as X and Y, the increment/decrement value as W and the number of undo/redo operations desired as V. The application determines the value of V as well as W. It's made sure that the value V is less than the difference between X and Y, otherwise the method would not work. Initially, the value of 'c' will be equal to X. By definition, the value of variable 'd' will be calculated as $[(V \times W)+c]$.

The value W can be a positive or negative value. A positive W value will mean X is the minimum value and Y is the maximum value in the range of values (X<Y, c<d), whereas, a negative W value will mean X is the maximum value and Y is the minimum value in the range of values (X>Y, c>d). The value of W should also be chosen so that $[(Y-X) \div W]$ is a positive integer. Ideally X and Y are chosen so that they are only limited by specifications of the data type used, platform, or machine, thus making sure there is a large difference between X and Y. For example, the data type unsigned byte has a value range from 0 to 255, so if variables 'u', 'c' and 'd' are represented by this data type, the values X and Y are chosen to be 0 and 255 respectively (or 255 and 0 respectively if W is negative). This large difference between X and Y will ensure that the values of variables 'u', 'c' and 'd' would not have to be reset frequently when value of the variable 'd' (or variable 'u') touches its limit Y. The value W is maintained constant once decided, whereas value of V could be changed if it is desired to have more or less levels of undo/redo operations, in which case the value of V or the value of 'd' will also have to be saved in addition to variables 'u' and 'c'. Optionally, a record of descriptions of the changes/states of the data is maintained that are easily identifiable with the corresponding value of the current index (value of variable 'u').

At each step, a backup is saved before recording any changes to the data. The backup can be saved in the form of a file, directory/folder (with files), a database row or chunk of data embedded within a file. If the backup is in the form of file or chunk of data embedded within a file, the format of the backup will be determined by the application. The name given to a backup will be unique and easily identifiable with the corresponding value of variable 'u' [and identifiable with the actual data if desired]. Optionally, date and/or time at that instant can also be saved with each backup [identifiable with the name of the backup or with the corresponding value of variable 'u'] for information purposes and/or for identifying timestamps of backups from the list of descriptions. If the backup is in the form of a file or directory/folder, their modified date/time can be used instead for the same purpose stated above.

The indexes ('u', 'c') and the optional collection of descriptions are saved for later access. Saving value of variable 'd' is not necessary if V is to remain constant since it can be easily calculated by the equation $[(V \times W)+c]$. The basic premise is to assign variables 'u' and 'c' an initial value of X. With each change done to the data, the value W is added to 'u' until the value of 'u' reaches the defined value 'd'. With each change beyond this value of 'd', the value W is added to the values of all three variables 'u', 'c' and 'd'. When the value of variable 'u' reaches value Y, any further change in order to be saved, would require all three variables 'u', 'c' and 'd' to be reset.

If backups are saved in the form of only 'changes' (e.g. the delta) rather than the entire data, the current state of user data will comprise of combination of the current backup and all the previous backups. Unless any backups are to be discarded by deletion, any operation involving deletion of a particular backup will also involve updating the next available backup to incorporate data from the backup to be deleted before that delete operation. Any restore operation on a particular backup will involve combining that backup (but not changing any of the said backups) with all the previous backups in order to restore the data to that particular state or make that data state current.

If the backups are in the form of a files or directories/folders and the modified date/time is used for information purposes (the collection of description for example), it is made sure that the modified date/times are kept unchanged during renaming backups or updating them (while incorporating changes from previous ones) to make sure backups will be listed in the order the changes were made.

Note that any single quote used to denote variables u, c, d and j are for simplicity of language only and that an undo or redo operation itself is not considered a change.

FIG. 1a-1d illustrate one embodiment of the method for saving backups while recording changes to the data. As shown, this information and backups can be used later for undoing or redoing any changes, at the user's discretion. The method can include a series of steps 1-9, as described below.

Figure 2A:
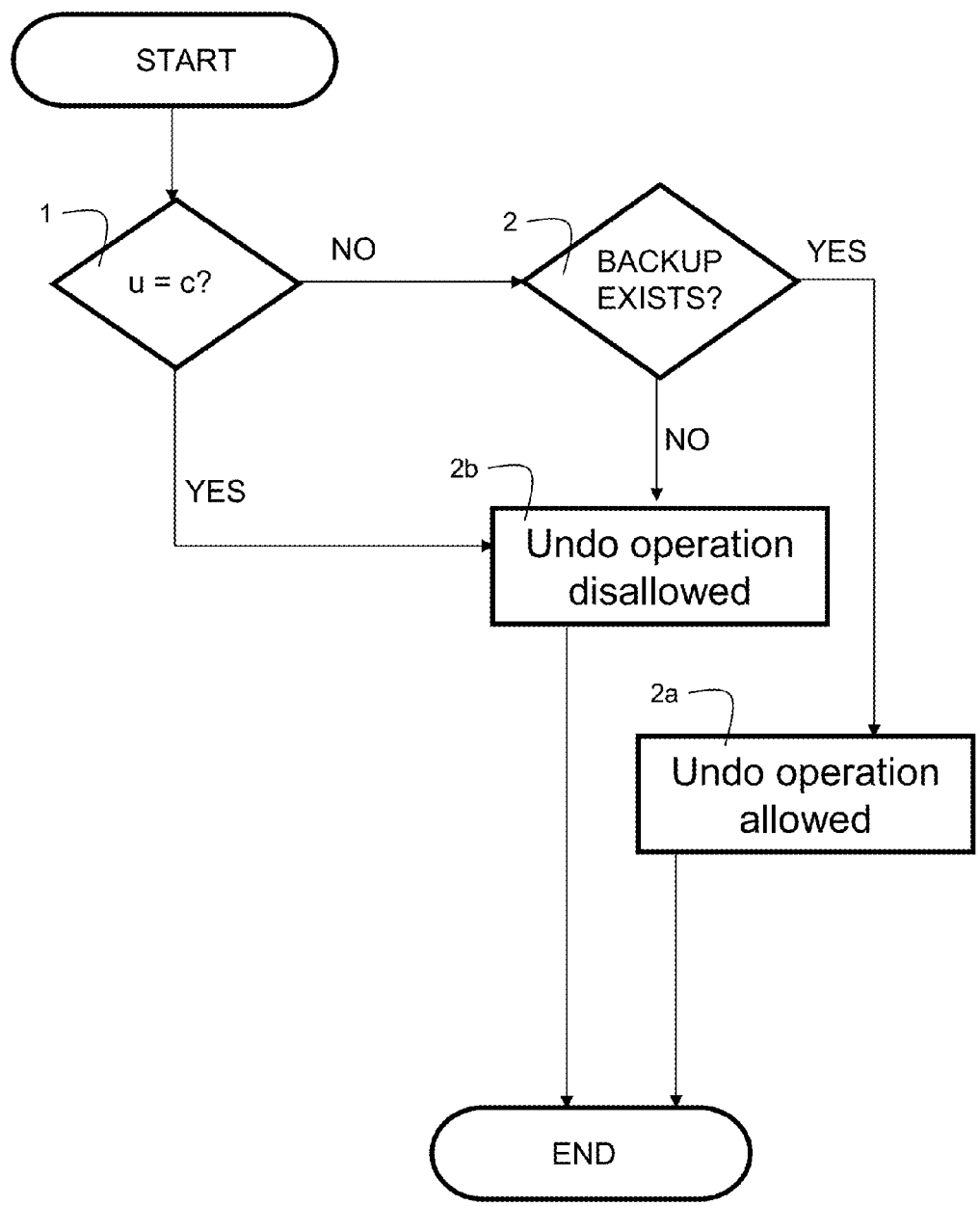
FIG. 2a depicts a flowchart to evaluate whether an undo operation is allowed.
Figure 2B:
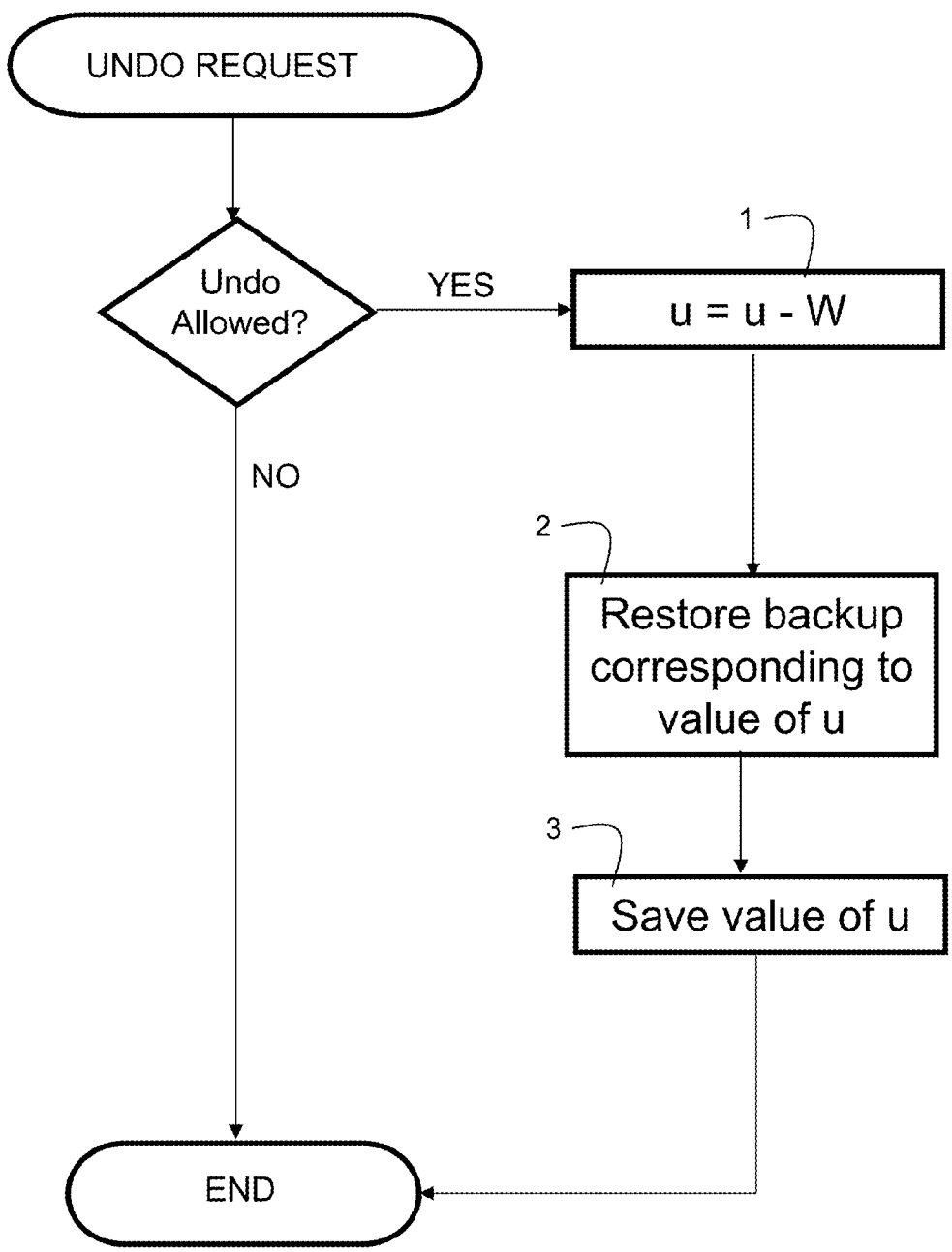
FIG. 2b depicts a flowchart to perform an undo operation if undo operation is allowed.

1. User input that can change the data is intercepted (received), and considered as a request to modify user data
2. The value of 'u' is compared against Y
   a. If value of 'u' is equal to Y, following steps are followed:
      i. The value of 'd' is made equal to $(V \times W)+X$
      ii. All backups corresponding to values of c, c+W, ..., Y−W, Y are renamed to correspond to values X, X+W, ..., d−W, d respectively. The new name can be calculated by adding X and subtracting c. For example backup corresponding to c will be renamed to c−c+X=X. Similarly backup corresponding to c+W will be renamed to (c+W)−c+X=(X+W) and so on.

iii. The collection of descriptions, if used, is updated to reflect the above change from c, c+W, . . . , Y−W, Y to values X, X+W, . . . , d−W, d respectively by updating its corresponding entries. If the backups are in the form of a file or directory/folder and the modified date/time is used for information purposes, it is made sure that the modified date/times are not changed during this reset to make sure backups will be listed in proper order.
  iv. The value of 'u' is made equal to value of 'd'
  v. The value of 'c' is made equal to value X.
  vi. The operation continues from step (3) below.
 b. If value of 'u' is unequal to Y, the operation continues from step (3) below
3. An initial backup corresponding to the current value of 'u' is saved (not overwriting if a backup with the same name exists). This step can be skipped if there is no data to be backed up, in which case the application will have to remember to restore to this data state if the user issues an undo command even though a corresponding backup would not exist.
4. The value of 'u' is made equal to (u+W), thus resulting in a new current index value.
5. The value of 'u' is compared against the value of 'd'
 a. If value of 'u' is greater than value of 'd' (or less than the value of 'd' if W is negative), following steps are followed:
  i. Backup corresponding to value of 'c' is deleted. If the application is saving only changes as backups as opposed to the entire data, all changes from the backup corresponding to 'c' are incorporated into the next backup which is the backup corresponding to (c+W) before this deletion. Furthermore, if backups are in the form of files or directories/folders, the modified date/time may be kept unchanged if the history of changes is to be shown against date/time for information purposes.
  ii. The value of 'c' is made equal to (c+W)
  iii. The collection of descriptions, if used, is updated by deleting the entry corresponding to the now current value of 'c'
  iv. The value of 'd' is made equal to (d+W) and the operation continues from step (7) below
 b. If value of 'u' is not greater than value of 'd' (or not less than the value of 'd' if W is negative), the operation continues from step (6) below
6. The value of 'u' is compared against value of 'd'
 a. If value of 'u' is less than value of 'd' (or greater than the value of 'd' if W is negative), all backups corresponding to values (u+W) through 'd' are discarded by deletion. If the application is saving only changes as backups as opposed to the entire data, changes from these backups need not be combined since they are to be discarded. The collection of description if used is also updated to remove these values and the operation continues from step (7) below
 b. If value of 'u' is not less than value of 'd', the operation continues from step (7) below
7. Another backup is saved corresponding to the now current value of 'u' (overwriting if a backup by the same name exists).
 a. Optionally, a description of this completed change, identifiable by the corresponding value of 'u', is saved [overwriting if a description identifiable by the same value of 'u' exists] in the collection of descriptions. This step can be performed before step (4), in which case, the description will be that of an impending change as opposed to a completed change and step (5.a.iii) will have to be performed before step (5.a.ii).
8. The values of 'u', 'c' (and optionally 'd') are saved in persistent memory (storage) for later retrieval
 a. Modified user data is ready to be saved at this stage if and when the user issues a save command. The state of this data to be saved will correspond to the backup identified by the now current value of variable 'u'.
9. Operation is terminated FIG. 2a illustrates one embodiment that includes a method for determining the allowance of an undo operation. The method can include a series of 2 steps, as described below.
1. The value of 'u' is compared against value of 'c'
 a. If value of 'u' is unequal to value of 'c', the operation continues from step (2) below
 b. If the value of 'u' is equal to value of 'c', undo operation is disallowed as shown in 2b
2. Backup corresponding to the value of (u−W) is checked
 a. If backup exists, undo operation is allowed as shown in 2a
 b. If backup does not exist, undo operation is disallowed as shown in 2b FIG. 2b illustrates one embodiment that includes a method for performing an undo operation. Method steps embodied in FIG. 2b can be performed when the method of FIG. 2a indicates such a function is allowed. The method for performing an undo operation can include a series of 3 steps, as described below.
1. If an undo operation is allowed, the value of 'u' is made equal to (u−W)
2. The backup corresponding to the now current value of 'u' is restored and/or made current ('made current' means that if the user has not saved the data after the last change, the state of the data to be saved next will correspond to the backup identified by the now current value of 'u'), thereby reverting the change done to the data and the outcome is reflected to the user. If the application is only saving changes as backups as opposed to entire data, all the changes from previous backups, if they exist, will have to be combined with the backup corresponding to the now current value of 'u' (without changing any of the backups) before this restore operation.
3. The value of 'u' is saved in persistent memory (storage) and the operation ends.

Figure 3:
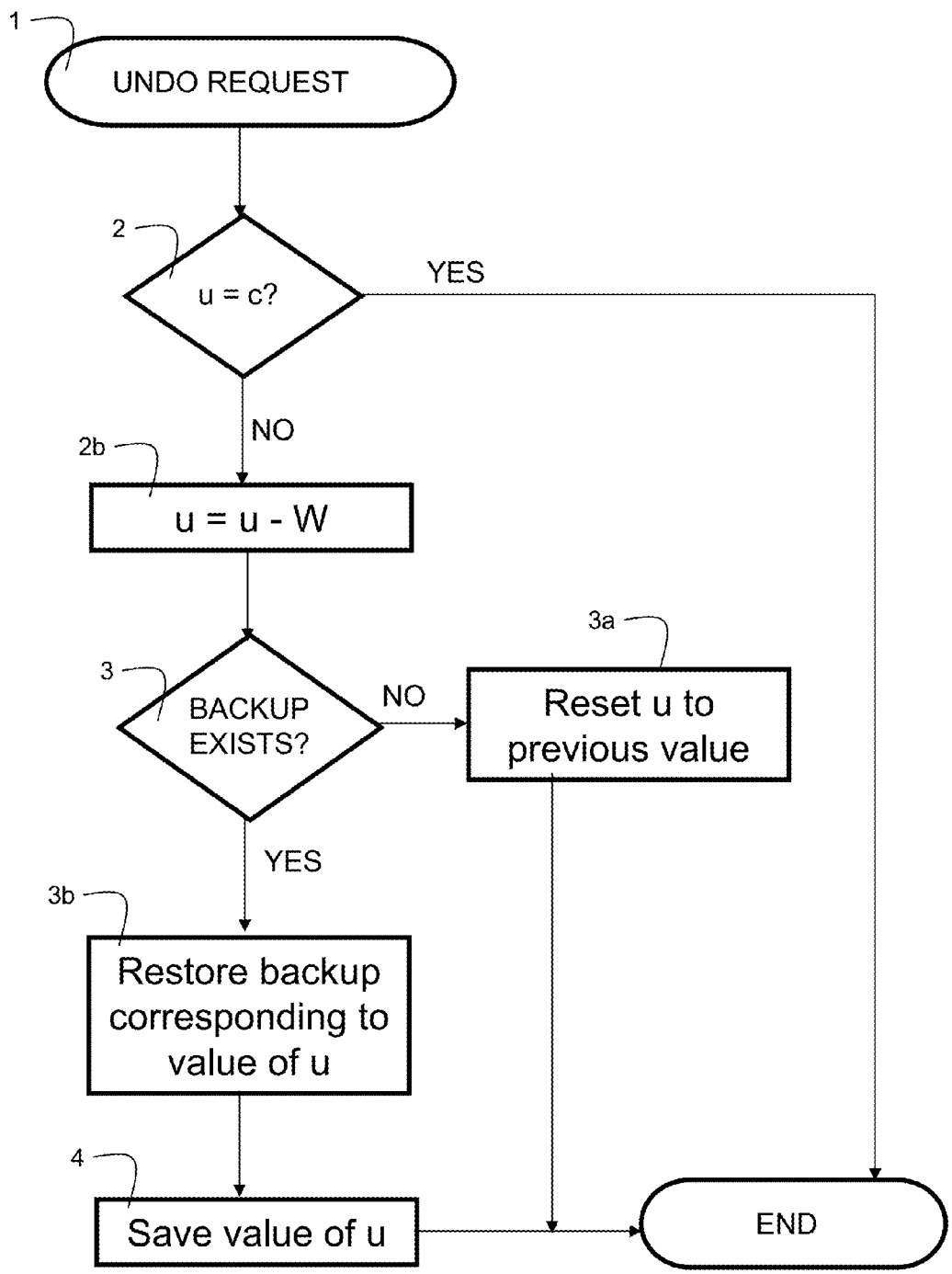
FIG. 3 depicts a flowchart highlighting the steps taken to perform a direct undo operation without checking any conditions beforehand.

FIG. 3 illustrates one embodiment that includes a method for performing a direct undo operation. Method steps embodied in FIG. 3 can be performed independent of the results of method steps in FIG. 2a. To this end, the method for performing a direct undo operation can be performed on already saved backups, and can include a series of 4 steps, as described below.
1. An undo request is intercepted.
2. The value of 'u' is compared against value of 'c'
 a. If value of 'u' is equal to value of 'c', the operation is terminated (i.e., undo operation cannot be performed)
 b. If value of 'u' is unequal to value of 'c', the value of 'u' is made equal to (u−W)
3. Next step is to check whether a backup corresponding to the now current value of 'u' exists.
 a. If backup does not exist, the now current value of 'u' is reset to its previous value i.e., in this case the value of 'u' is changed back to (u+W) and the operation is terminated (i.e., undo operation cannot be performed).

b. If backup exists, it is restored and/or made current ('made current' means that if the user has not saved the data after the last change, the state of the data to be saved next will correspond to the backup identified by the now current value of 'u'), thereby reverting the change done to the data and the outcome is reflected to the user. If the application is only saving changes as backups as opposed to entire data, all the changes from previous backups, if they exist, will have to be combined with the backup corresponding to the now current value of 'u' (without changing any of the backups) before this restore operation.

4. The value of 'u' is saved in persistent memory (storage) and the operation terminates.

Figure 4A:
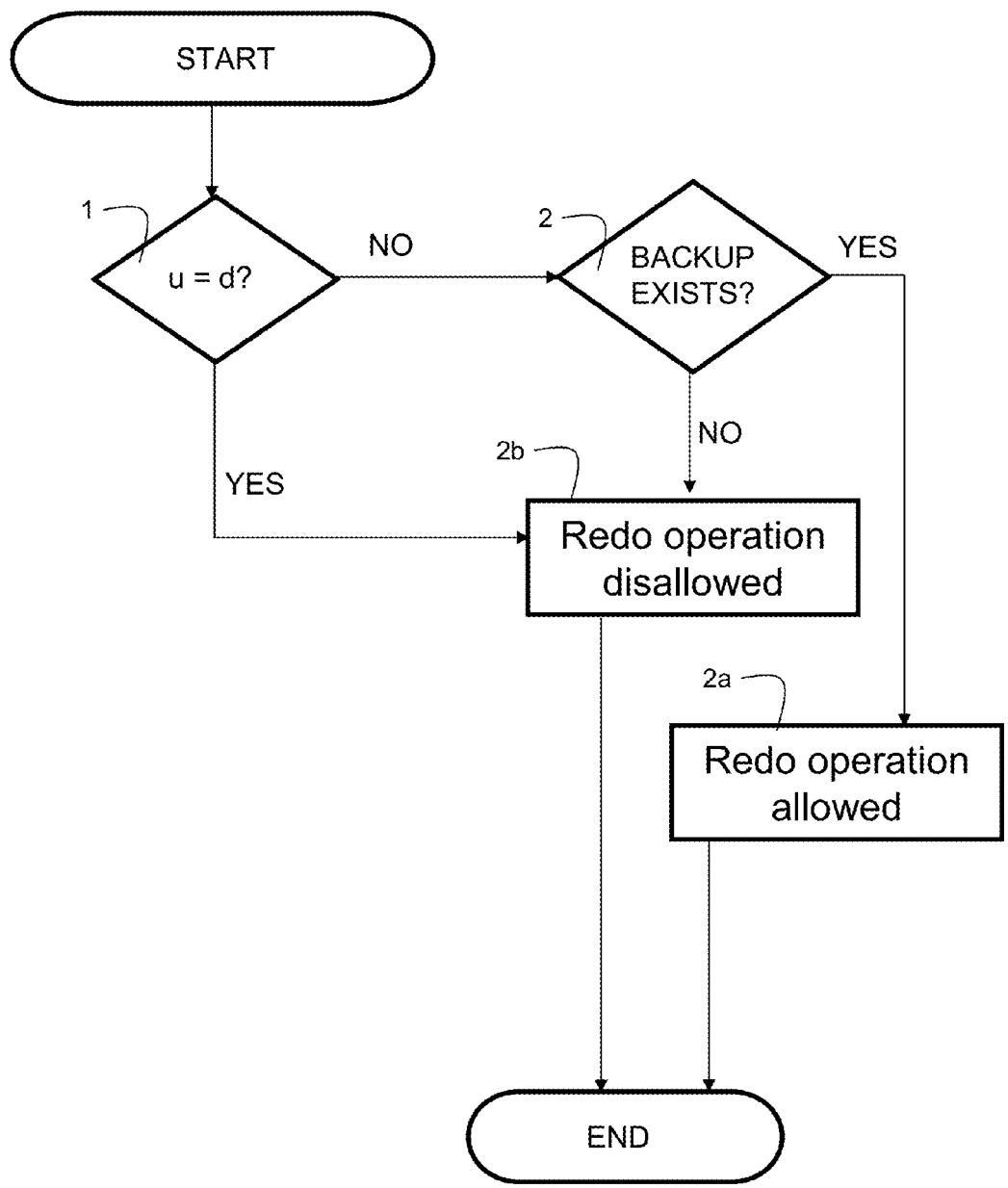
FIG. 4a depicts a flowchart to evaluate whether a redo operation is allowed.

FIG. 4a illustrates one embodiment that includes a method for determining the allowance of a redo operation, that includes a series of 2 steps, as described below.

Figure 4B:
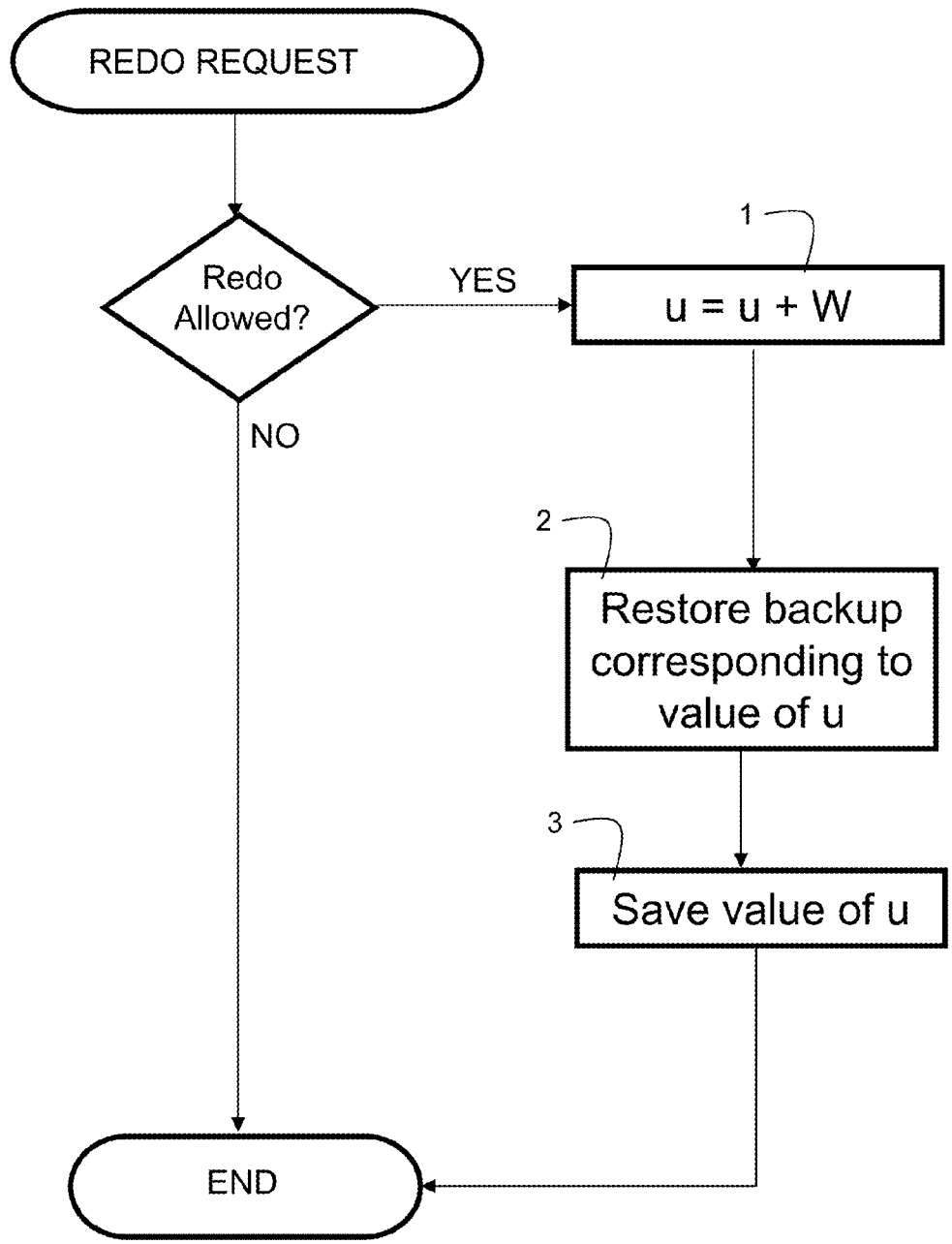
FIG. 4b depicts a flowchart to perform a redo operation if redo operation is allowed.

1. The value of 'u' is compared against value of 'd'
   a. If value of 'u' is unequal to value of 'd', the operation continues from step (2) below
   b. If the value of 'u' is equal to value of 'd', redo operation is disallowed as shown in 2b
2. Backup corresponding to the value (u+W) is checked
   a. If backup exists, redo operation is allowed as shown in 2a
   b. If backup does not exist, redo operation is disallowed as shown in 2b FIG. 4b illustrates one embodiment that includes a method for performing a redo operation. Method steps embodied in FIG. 4b can be performed when the method of FIG. 4a indicates such a function is allowed. The method for performing a redo operation can include a series of 3 steps, as described below.

1. If a redo operation is allowed, the value of 'u' is changed to (u+W)
2. The backup corresponding to the now current value of 'u' is restored and/or made current ('made current' means that if the user has not saved the data after the last change, the state of the data to be saved next will correspond to the backup identified by the now current value of 'u'), thereby redoing previously reverted change to the data and the outcome is reflected to the user. If the application is only saving changes as backups as opposed to entire data, all the changes from previous backups, if they exist, will have to be combined with the backup corresponding to the now current value of 'u' (without changing any of the backups) before this restore operation.
3. The value of 'u' is saved in persistent memory (storage) and the operation ends.

Figure 5:
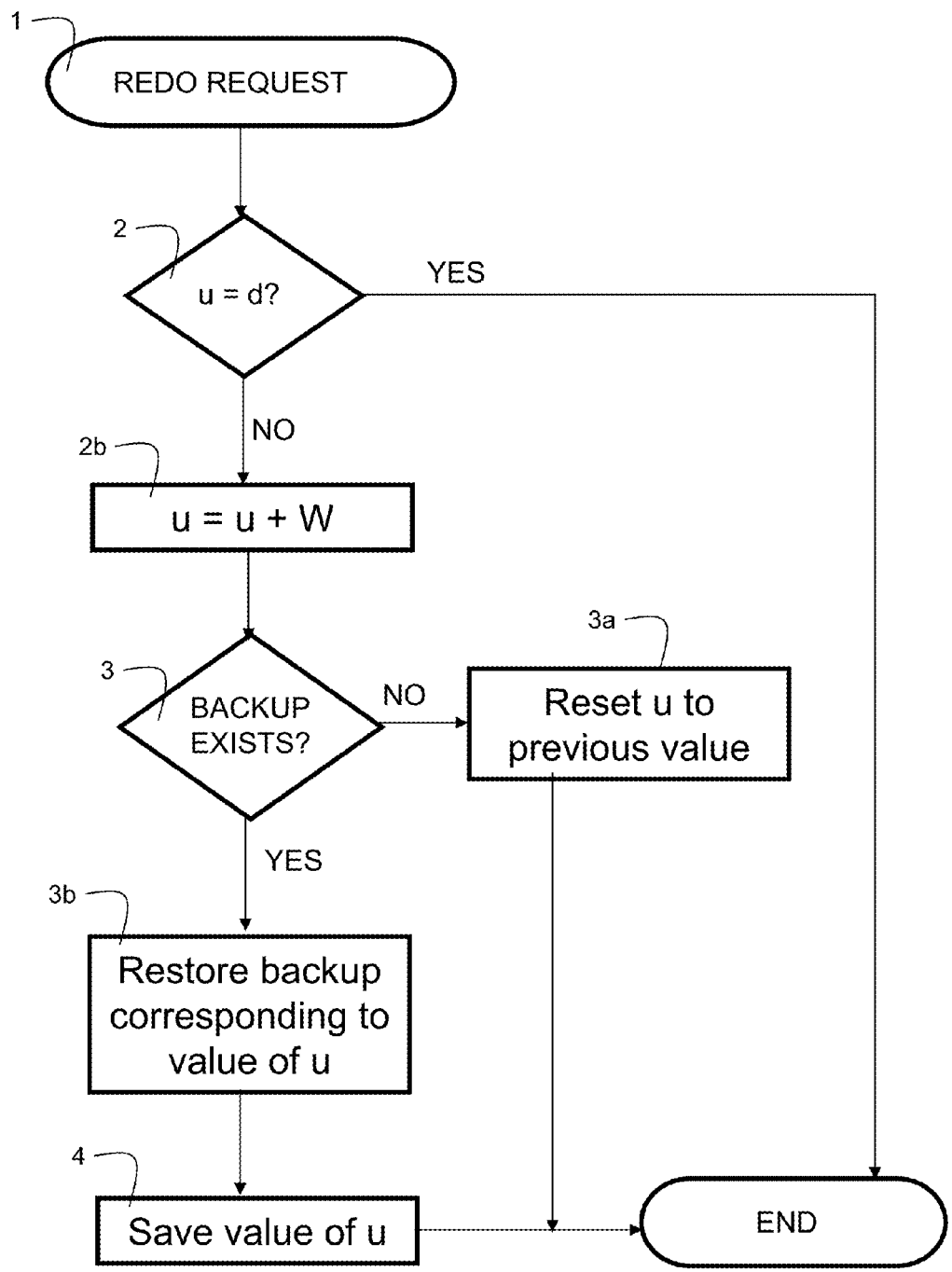
FIG. 5 depicts a flowchart highlighting the steps taken to perform a direct redo operation without checking any conditions beforehand.

FIG. 5 illustrates one embodiment that includes a method for performing a direct redo operation. Method steps embodied in FIG. 5 can be performed independent of the results of method steps in FIG. 4a. To this end, the method for performing a direct redo operation can be performed on already saved backups, and can include a series of 4 steps, as described below.

1. A redo request is intercepted.
2. The value of 'u' is compared against 'd'
   a. If value of 'u' is equal to value of 'd', the operation terminates (i.e., redo operation cannot be performed).
   b. If value of 'u' is unequal to value of 'd', the value of 'u' is made equal to (u+W)
3. Next step is to check whether a backup corresponding to the now current value of 'u' exists.
   a. If backup does not exists, now current value of 'u' is reset to its previous value i.e., in this case the value of 'u' is changed back to (u−W) and the operation is terminated (i.e., redo operation cannot be performed).
   b. If backup exists, it is restored and/or made current ('made current' means that if the user has not saved the data after the last change, the state of the data to be saved next will correspond to the backup identified by the now current value of 'u'), thereby redoing previously reverted change to the data and the outcome is reflected to the user. If the application is only saving changes as backups as opposed to entire data, all the changes from previous backups, if they exist, will have to be combined with the backup corresponding to the now current value of 'u' (without changing any of the backups) before this restore operation.
4. The value of 'u' is saved in persistent memory (storage) and the operation terminates.

Figure 6A:
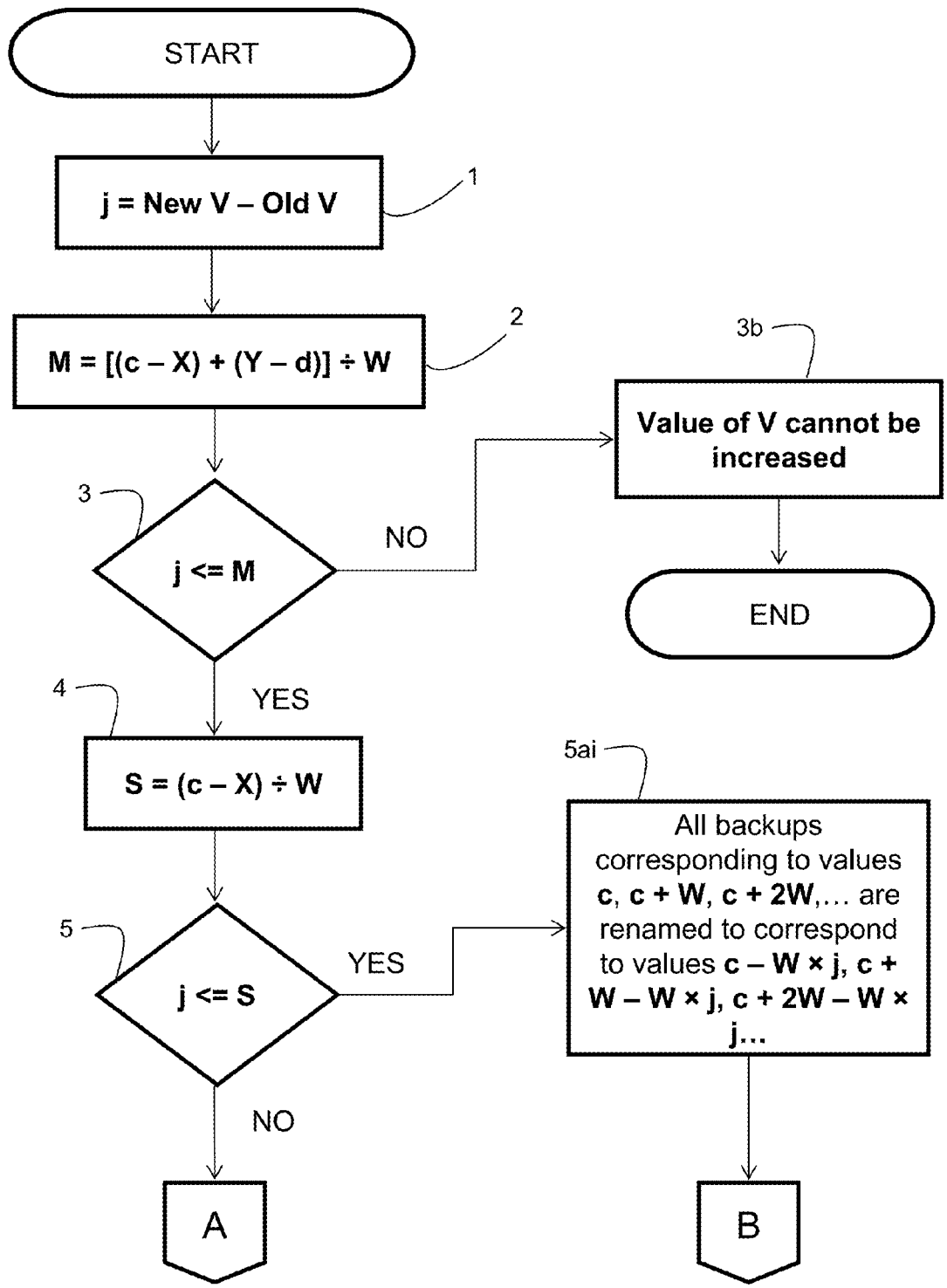
FIGS. 6a-6c depict a flowchart highlighting the steps taken to increase the number of undo and redo operations
Figure 6B:
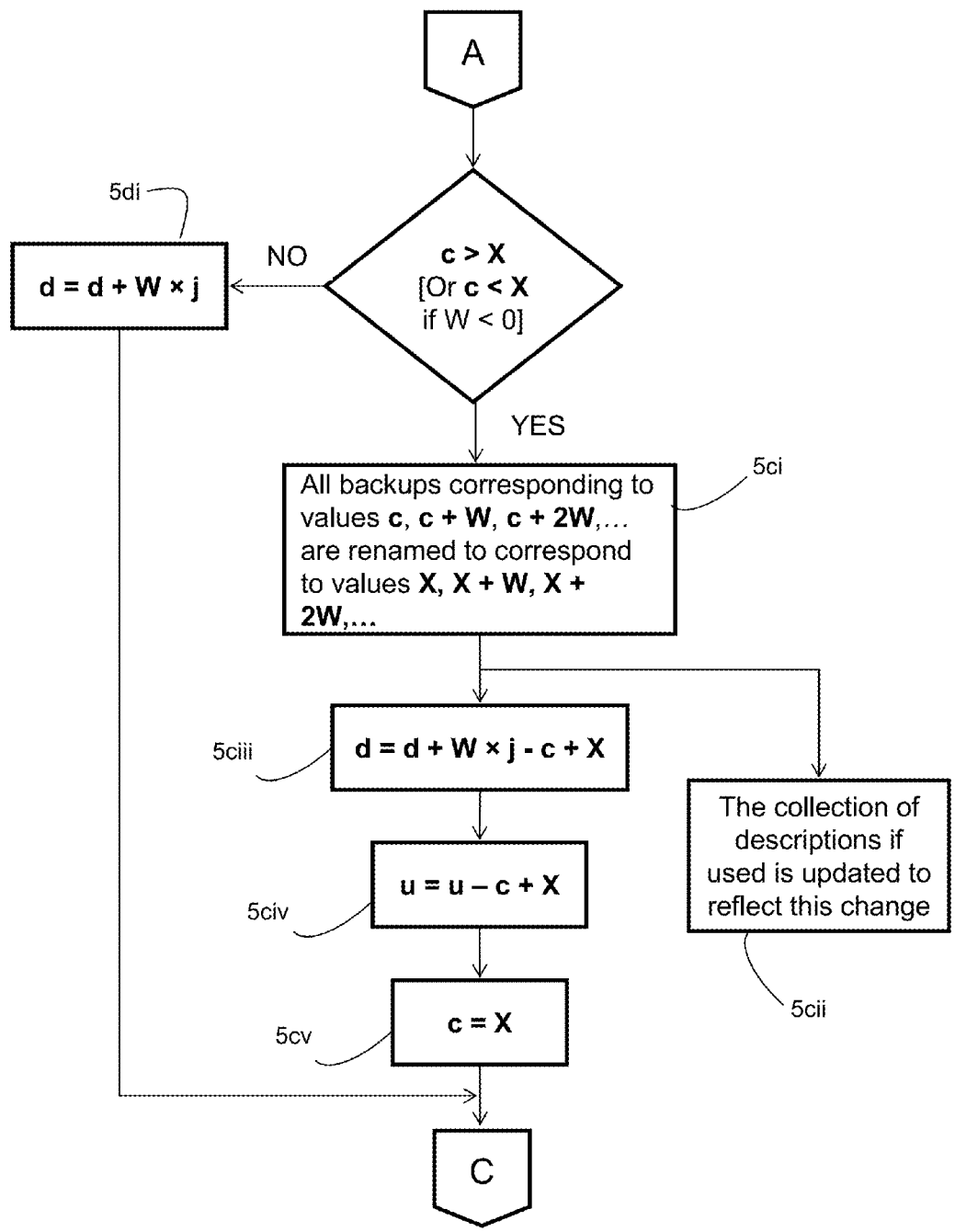
Figure 6C:
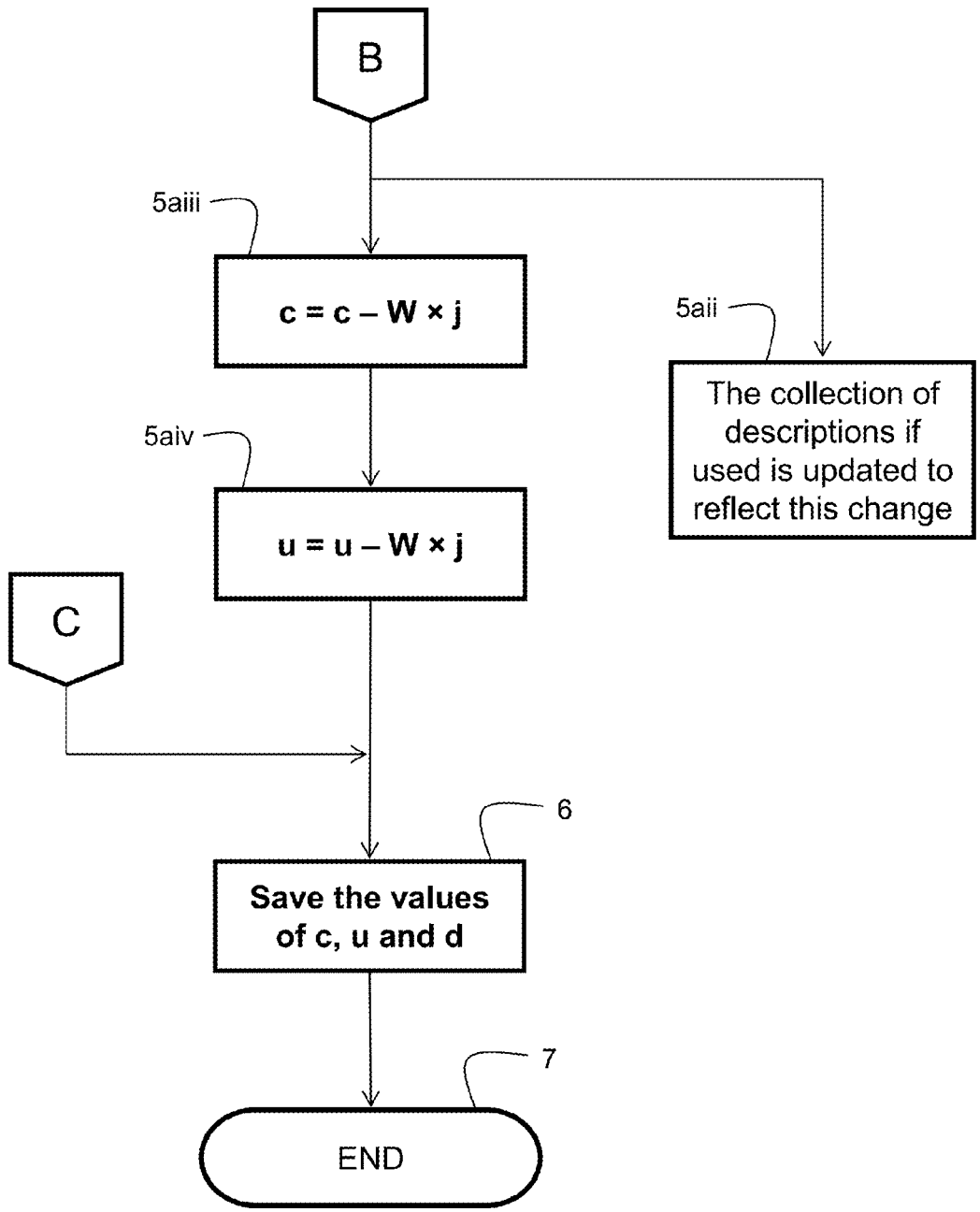

FIG. 6a-6c illustrates one embodiment that includes a method for increasing the number of undo and redo operations. In embodiments, an application may adjust the maximum number of undo and/or redo operations allowed as the program is operating. For example, in some embodiments, and in-app purchase may unlock extended capability. Another use case is conversion of a software package from a shareware version to a paid version, where the paid version enables additional levels of undo/redo. In embodiments, the system receives a request to change the maximum allowable undo/redo operations, represented by a change in the value V depicted in the flowchart of FIG. 6a. If certain criteria are met, the change in the undo/redo limits is allowed, and the undo and/or redo limits are adjusted accordingly, such that the system sets the undo and redo operations to new maximum allowable values. In embodiments, the undo and redo limits may be adjusted independently of each other.

The number of undo and redo operations (the value V) cannot be changed during an ongoing operation such as undo, redo or saving backups while recording changes to data. The maximum amount of increase in the undo and redo operations (increase in V) allowed is the sum of the differences between c and X and Y and d. Let 'M' be the maximum allowed increase in the number of undo and redo operations, therefore, $$M=[(c-X)+(Y-d)]\div W$$

Let's call the increase in value V as 'j'. The value of 'j' will be calculated as (New V−Old V). Assuming 'j' is less than or equal to the maximum allowed increase as specified above. Let's call the region of the values between c and X as Start Region (S) and the region of values between d and Y as the End Region (E). The value of 'j' is distributed between these two regions with preference given to the start region for renaming backup files. The reason the start region is preferred is that after renaming the backups to new names, and resetting values of 'c' and 'u', the new value of 'u' will be farther away from Y so as to have more time/changes between current value of 'u' and when 'u' reaches Y.

Figure 7A:
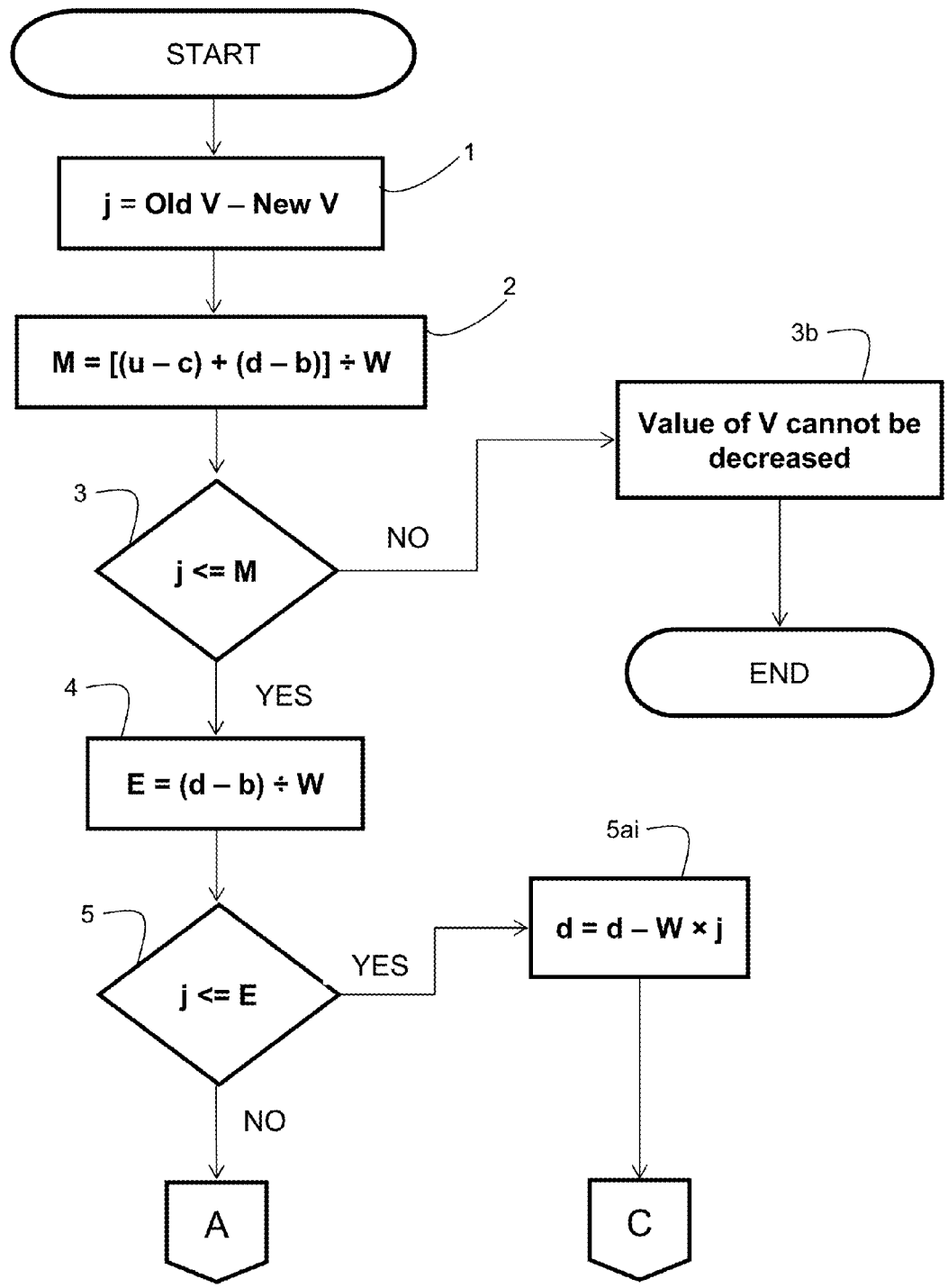
FIGS. 7a-7c depict a flowchart highlighting the steps taken to decrease the number of undo and redo operations
Figure 7B:
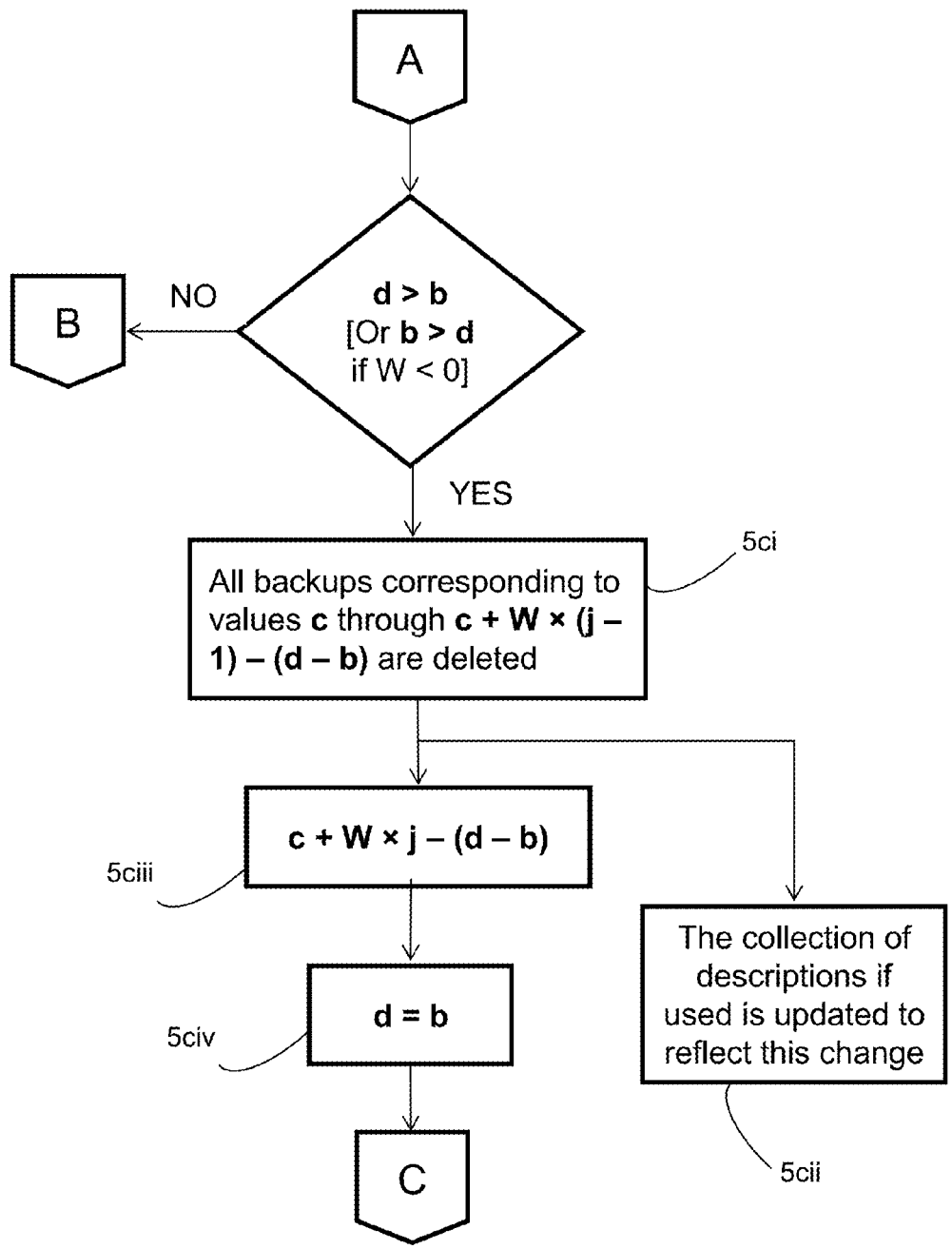
Figure 7C:
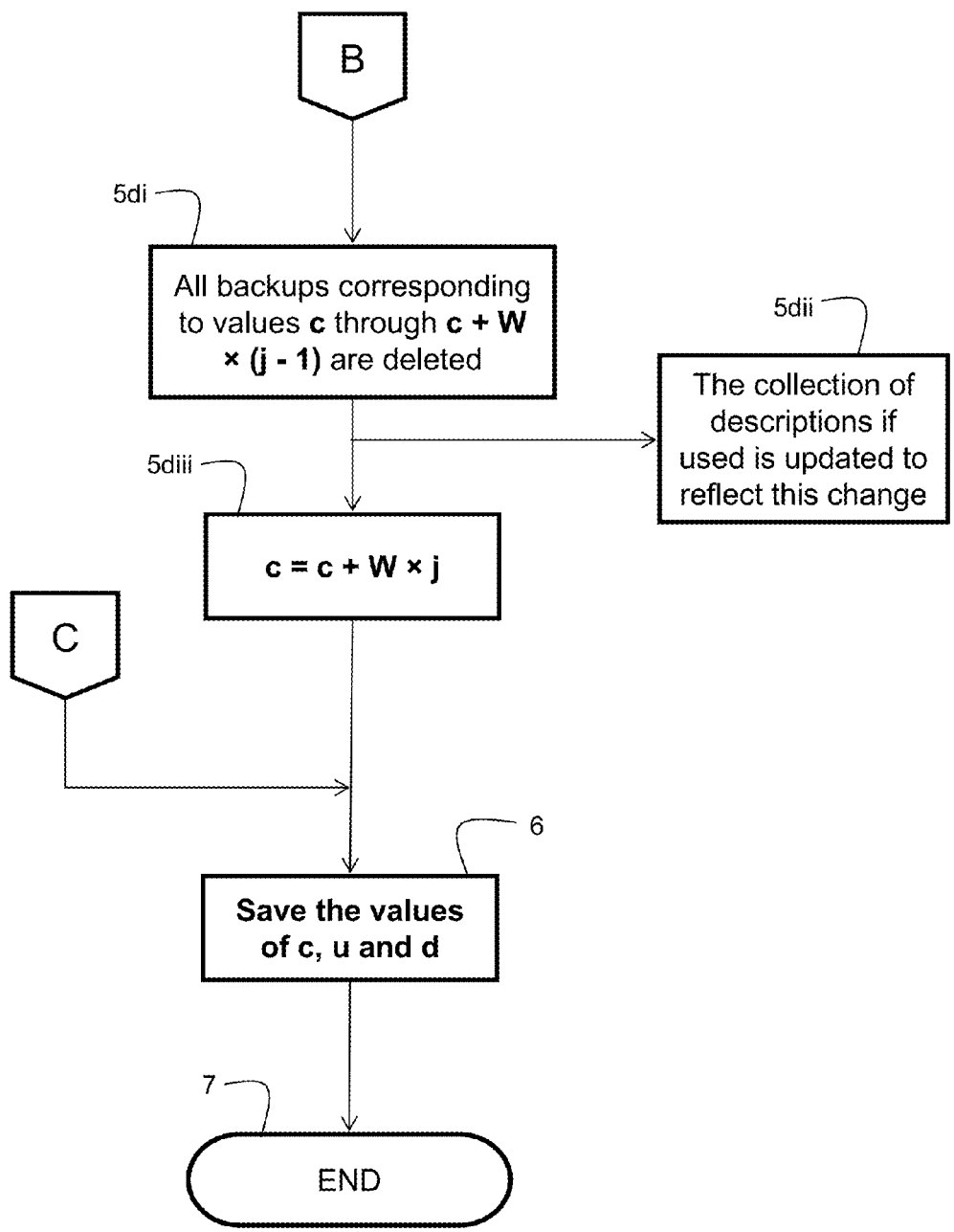

1. The desired increase is calculated as j=New V−Old V
2. The maximum allowed increase is calculated as M=[(c−X)+(Y−d)]÷W
3. The value of 'j' is compared against M
   a. If 'j' is less than or equal to the value M, the operation continues from point 4 below
   b. If 'j' is greater than M, the value V cannot be increased and the operation terminates
4. The number of possible values in the start region is calculated as S=(c−X)÷W
5. The value of 'j' is compared against S
   a. If the value of 'j' fits completely in the start region. i.e., j<=S i. All the backups corresponding to c, c+W, c+2W, ... are renamed to correspond to values c−W×j, c+W−W×j, c+2W−W×j, .... If backups are in the form of files or directories/folders, the modified date/time may be kept unchanged if the history of changes is to be shown against date/time for information purposes
ii. The collection of descriptions if used is updated to reflect the change
iii. The value of c is made equal to c−W×j
iv. The value of u is made equal to u−W×j
v. The operation continues from step (6) below
b. If the value of 'j' cannot fit completely in the start region i.e., j>S, then value of c is compared against X
c. If c>X (or c<X if W is negative) then
i. All the backups corresponding to c, c+W, c+2W, ... are renamed to correspond to values X, X+W, X+2W, .... That is subtracting c and adding X from the number that identifies the backup. If backups are in the form of files or directories/folders, the modified date/time may be kept unchanged if the history of changes is to be shown against date/time for information purposes
ii. The collection of descriptions if used is updated to reflect the change
iii. By changing the backup names, we accounted only for (c−X) [or (X−c) if W is negative] portion out of a total 'j'. The remaining value is accounted for by making variable 'd' equal to d+W×j−c+X
iv. The value of u is made equal to u−c+X
v. The value of c is made equal to X
vi. The operation continues from step (6) below
d. If c=X then
i. The value of variable 'd' is made equal to d+W×j
ii. The operation continues from step (6) below
6. The values of 'c', 'u' and 'd' (and optionally V) are saved in persistent memory (storage) for later retrieval
7. The operation terminates FIG. 7a-7c illustrates one embodiment that includes a method for decreasing the number of undo and redo operations:

The number of undo and redo operations (the value V) cannot be changed during an ongoing operation such as undo, redo or saving backups while recording changes to data.

The maximum amount of decrease in the undo and redo operations (decrease in V) allowed will be the sum of the difference between u and c and d and b where b is the number identified by the latest (newest) backup. Let 'M' be the maximum allowed decrease in the number of undo and redo operations, therefore, $$M=[(u-c)+(d-b)]\div W$$

Figure 8A:
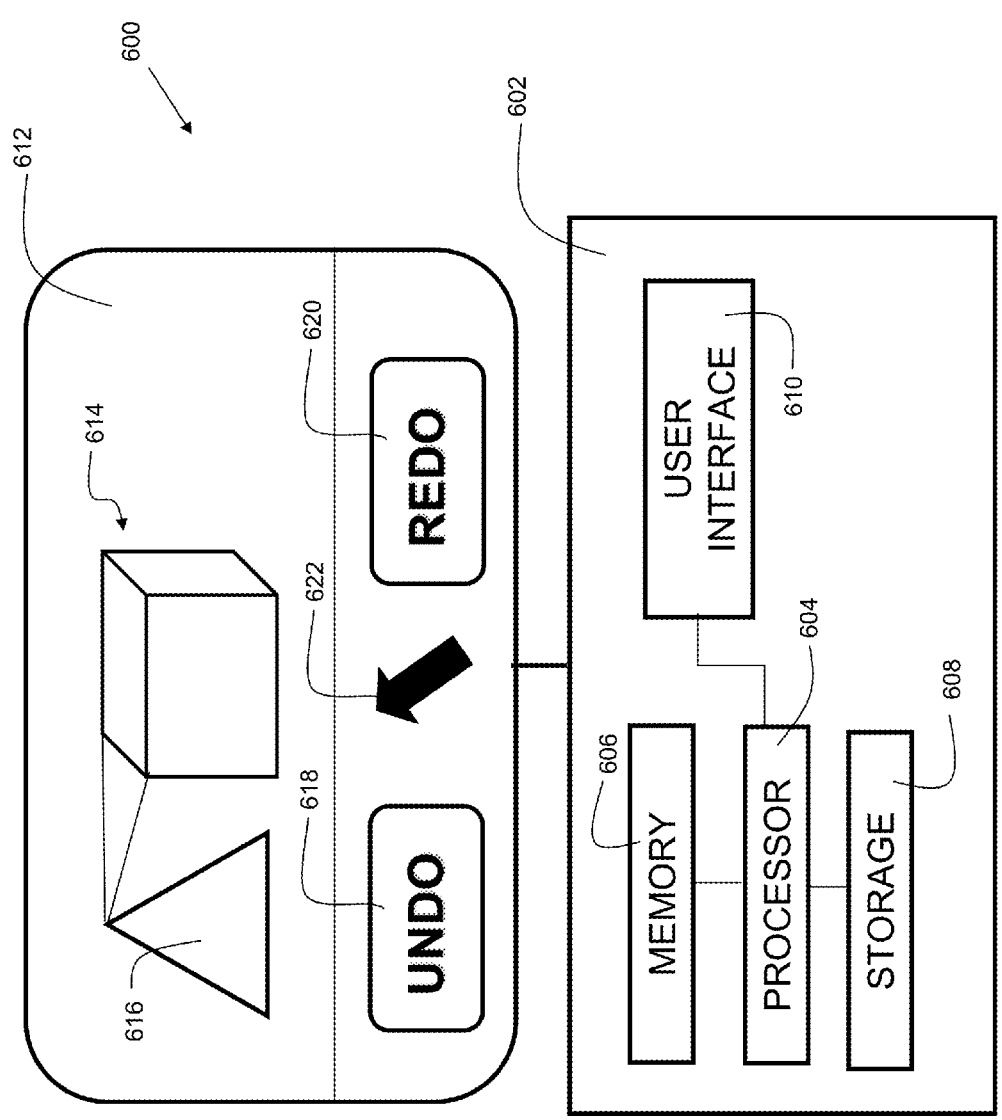

Let's call the decrease in value V as 'j'. Maintaining 'j' positive for the sake of simplicity and understanding, the value of 'j' will be calculated as (Old V−New V). Assuming 'j' is less than or equal to the maximum allowed decrease as specified above. Let's call the region of the values between 'c' and 'u' as Start Region and the region of values between 'b' and 'd' as the End Region. The value of 'j' has to be distributed between these two regions with preference given to the End region (E) in order to avoid deleting backups if possible.
1. The desired decrease is calculated as j=Old V−New V
2. The maximum allowed decrease is calculated as M=[(u−c)+(d−b)]÷W
3. The value of 'j' is compared against M
   a. If 'j' is less than or equal to the value M, the operation continues from point 4 below
   b. If 'j' is greater than M, the value V cannot be decreased and the operation terminates
4. The number of possible values between d and b is calculated as E=(d−b)÷W
5. The value of 'j' is compared against E
   a. If the value of 'j' fits completely in the end region. i.e., j<=E
      i. The value of 'd' is made equal to d−W×j
      ii. The operation continues from step (6) below
   b. If the value of 'j' cannot fit completely in the end region i.e., j>E, the value of d is compared against b
   c. If d>b (or d<b if W is negative) then
      i. Only the (d−b) [or b−d if W is negative] part of a total 'j' will be accounted for in the end region. The remaining portion of 'j' is accounted for by deleting all backups corresponding to values c through c+W×(j−1)−(d−b) if they exist. If the application is saving only changes as backups as opposed to the entire data, all changes from these "to be deleted" backups are incorporated into the next backup which is backup corresponding to c+W×j−(d−b) before the deletion. Furthermore, if backups are in the form of files or directories/folders, the modified date/time may be kept unchanged if the history of changes is to be shown against date/time for information purposes.
      ii. The collection of descriptions if used is updated to reflect this change.
      iii. The value of c is made equal to c+W×j−(d−b)
      iv. The value of d is made equal to b
      v. The operation continues from step (6) below
   d. If d=b then
      i. All backups corresponding to values c through c+W×(j−1) if exist are deleted. If the application is saving only changes as backups as opposed to the entire data, all changes from these "to be deleted" backups are incorporated into the next backup which is backup corresponding to c+W×j before the deletion. Furthermore, if backups are in the form of files or directories/folders, the modified date/time may be kept unchanged if the history of changes is to be shown against date/time for information purposes.
      ii. The collection of description if used is updated to reflect this change.
      iii. The value of c is made equal to (c+W×j)
      iv. The operation continues from step (6) below
6. The values of 'c', 'u' and 'd' (and optionally V) are saved in persistent memory (storage) for later retrieval
7. The operation terminates FIGS. 8a-8d depict block diagrams of a system in accordance with embodiments of the present invention. Referring now to FIG. 8a, system 600 comprises computer 602, and display 612. Computer 602 comprises a processor 604 which is configured to access a memory 606. The memory 606 may be a non-transitory memory, and may be implemented with SRAM, ROM, Flash, or other suitable memory technology. The memory 606 contains instructions, that when executed by the processor 604, perform the steps previously described to enable persistent undo/redo operations. In addition to memory 606, a storage module 608 for large storage may further be included. In embodiments, the storage module 608 may be comprised of one or more hard disks. A user interface 610 is coupled to processor 604 so that user input can be received by processor 604. In embodiments, the user interface 610 may include, but is not limited to, a keyboard, a pointing device such as a mouse or trackball, a touch screen, or other suitable device. In the examples for FIGS. 8a-8d, a graphics application is shown. Display 612 comprises an area for rendering user data 614. User data 614 comprises graphical shapes. A cursor 622 is displayed on the display 612, and is controlled by the user interface 610. An undo button 618 and redo button 620 are also rendered on display 612. In some embodiments, hot keys or other commands may be used to invoke the undo/redo functionality, instead of, or in addition to the undo button 618 and redo button 620.

In FIG. 8*b*, the cursor 622 is placed over the undo button 618, but is not yet clicked. In embodiments, placing the cursor over the undo button 618 (also known as a "mouse-over" operation) causes the system 600 to render a preview of the undo request prior to processing the undo request. In the example of FIG. 8*b*, the triangle 616 is now rendered in a broken line pattern, indicating that if the undo button 618 is clicked, the triangle 616 will be removed.

Figure 8C:
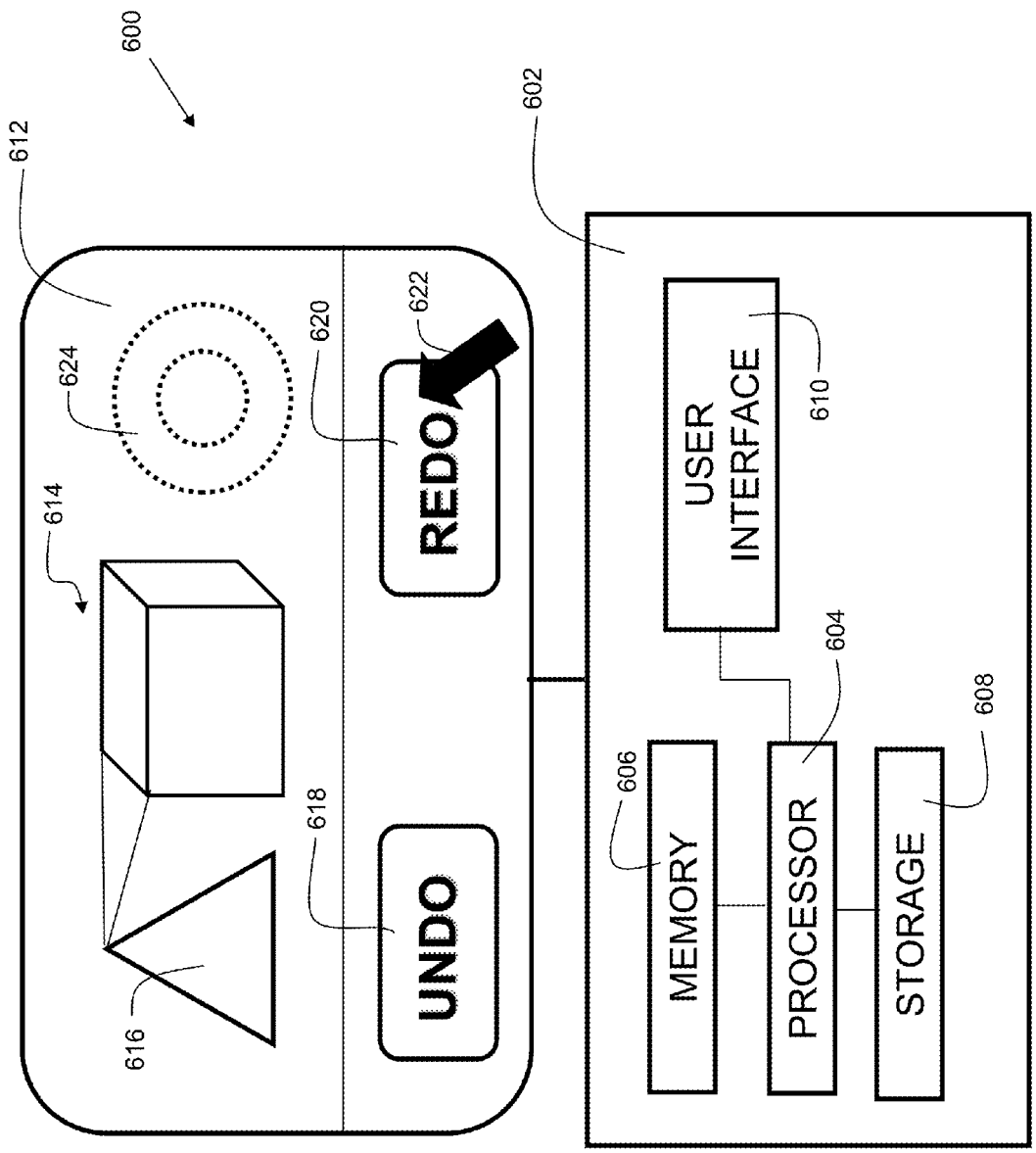
Figure 8D:
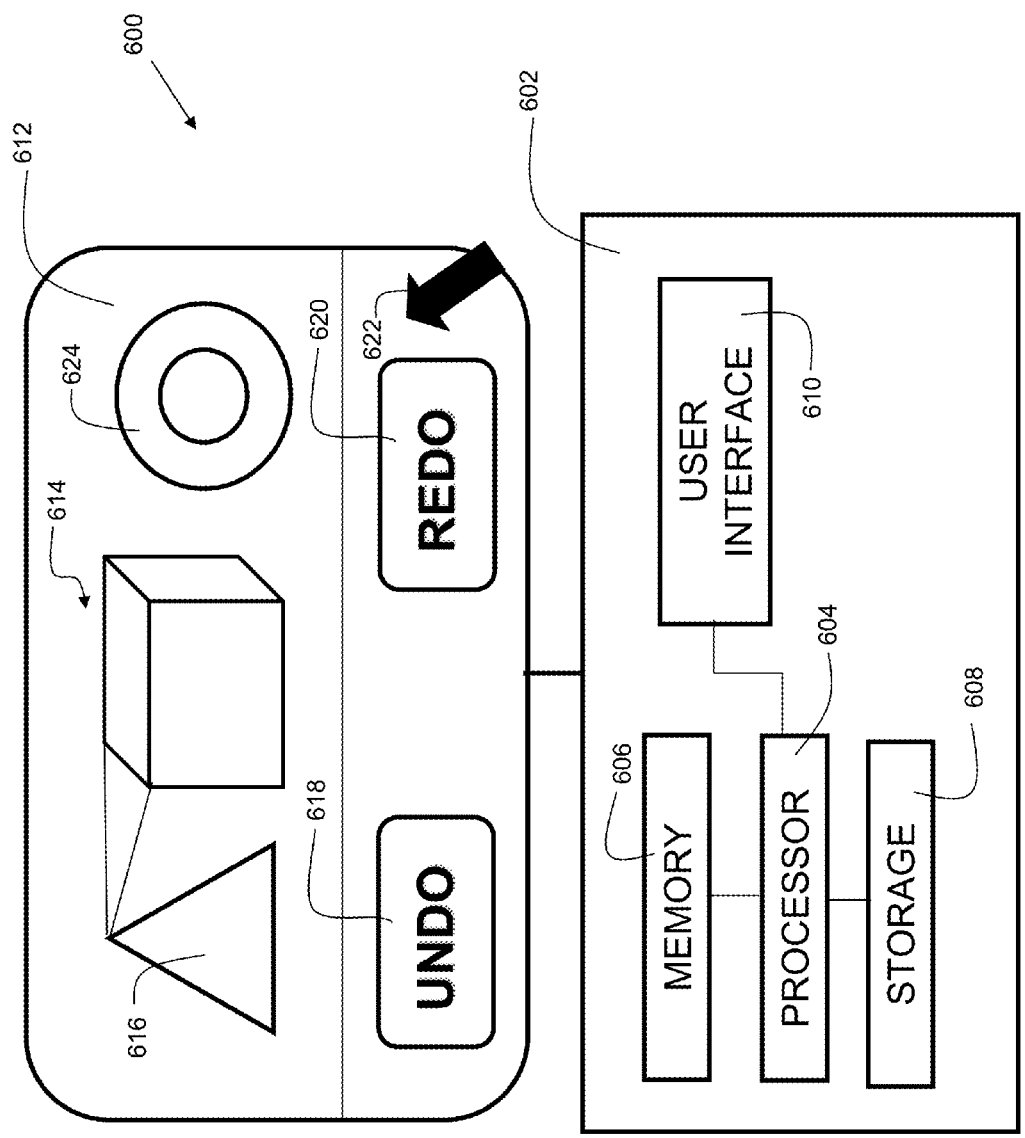

Similarly, in FIG. 8*c*, a mouse-over of the redo button 620 is shown. The cursor 622 is placed over the redo button 620, causing the system 600 to render a preview of the redo request prior to processing the redo request. A shape 624 is displayed in a broken line pattern, indicating that if the redo button 620 is clicked, the shape 624 will be restored. In FIG. 8*d*, the user has clicked the redo button 620 to restore the shape 624, which is now rendered in solid lines. In embodiments, different colors may be used to render a preview of a redo/undo operation, and/or the objects to be undone or redone may blink or flash on screen as part of the preview of the undo/redo operation.

FIGS. 9*a*-9*m* show an example of Undo/Redo operations for a word processing application. The following scenarios show an example of an implementation of persistent undo and redo functionality in accordance with embodiments of the present invention. As can be appreciated, embodiments of the present invention may be used with a variety of applications, including, but not limited to, word processing, spreadsheet applications, computer-aided design (CAD) programs, photo editing programs, source code editing programs, sound recording/editing programs, and the like. In the example below, a word processing application is considered, in which there is a document file where the user plans to write the word "SHASHANK BHIDE". The following considerations are made for the sake of this example:

X=0 (constant)
Y=10 (constant)
W=1 (constant)
V=5

Therefore initially, variable 'c' and variable 'u' would both be equal to 0 and variable 'd' will be equal to 5.
c=0
u=0
d=5 [calculated as (V×W)+c]

This is depicted in FIG. 9*a*. The user display 204, which may be implemented via a flat panel computer display, LCD screen, OLED display, or other suitable technology, is currently blank, reflecting that no text has yet been typed. The initial state of the variables is shown in box 208. The undo button 210 is currently in a disabled (grayed out) state, since no undo operations are possible yet. Similarly, the redo button 212 is currently in a disabled (grayed out) state, since no redo operations are possible yet. A text cursor 205 indicates the position where new text is applied.

There are various possibilities for determining the smallest possible change to track. For example, in a word processing context, each character typed may be treated as a change. In other embodiments, each word typed, or each sentence typed, may be treated as a change. In this embodiment, a "change" to the user data refers to each letter typed by the user. In this embodiment, the system implementing this method uses files as "backups" and the filename format is "<USERNAME>_<VOU>_TXT.b" where <USERNAME> is the name of the user and <VOU> is the value of variable 'u' just before the backup file is saved.

In this embodiment the system will save backups in the form of only changes (e.g. a 'delta') rather than saving the entire data every time. The system will save an identifier with each backup to know what change the backup exactly was. If the user typed an 'S', the system decides to save a plus sign in the backup saying an 'S' was added. So the backup will have the content +S. The identifier will not appear as part of the actual data.

Since the system is only saving changes as backups and not the entire data, any operation involving deleting of a particular backup will also involve updating the next available backup to incorporate data from the backup to be deleted before that delete operation. Any restore operation on a particular backup will involve combining that backup (but not changing any of said backups) with all the previous backups in order to restore the data to that particular state or make that state current.

In this embodiment, a list is maintained to track what exact change the user has made in the form key value pairs and the system describes the change after the change has been made. In this embodiment, the key is the value of 'u' and value is the description of the change. Let the notation be ['u']::[<DESCRIPTION>]

In this embodiment, the changes are reflected to the user on their user display.

Figure 9B:
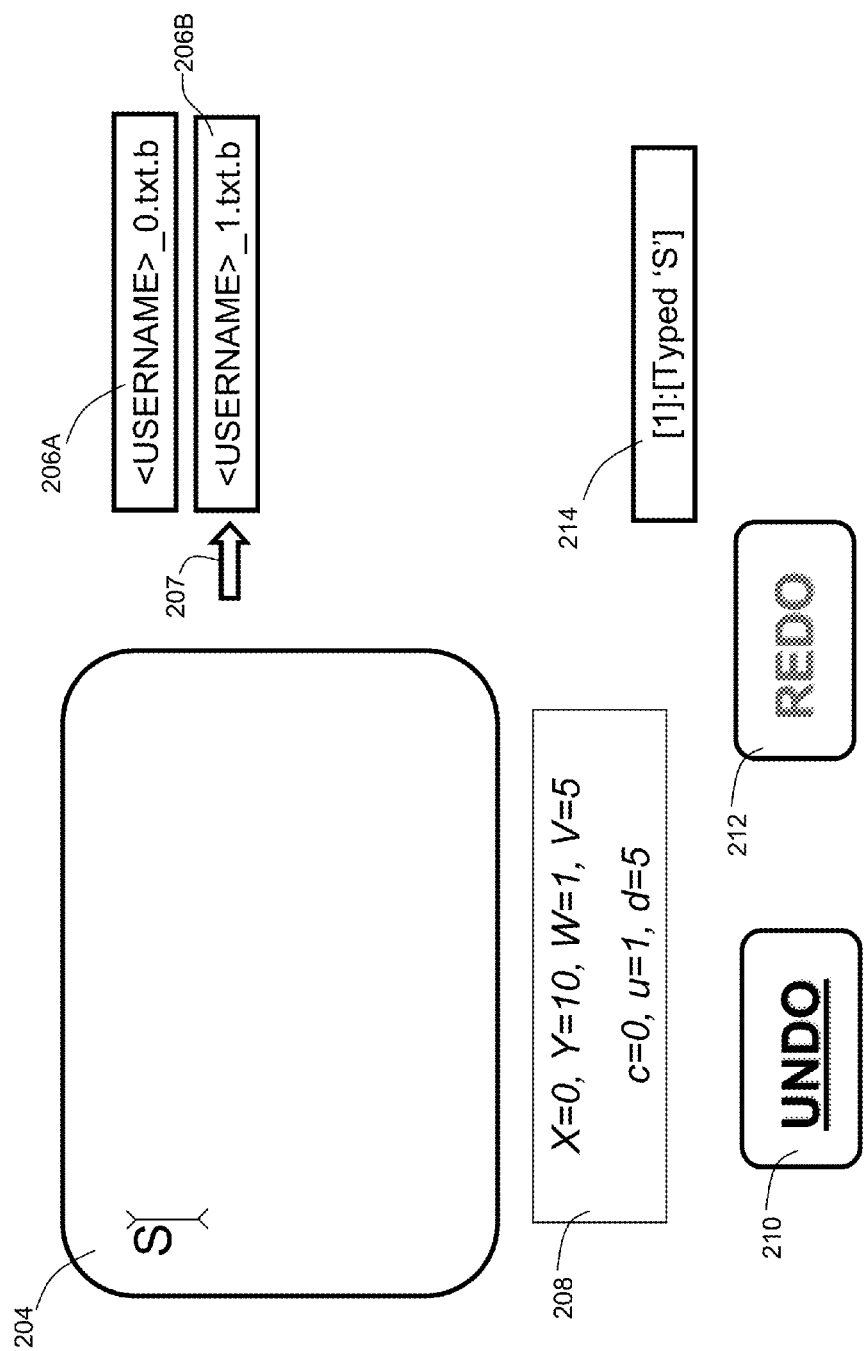

FIG. 9*b* shows an example of the (X+W)th change. Refer also to the flow of FIG. 1 (Saving backups while recording changes to the data)

When the user types the first letter 'S' in the system, the system checks whether 'u' is equal to Y, which in this case is not true (u=0, Y=10).

The system checks whether the backup file <USERNAME>_0_TXT.b exists, which in this case does not, so it saves a backup with this file name. As shown in FIG. 9*a*, a first file 206A is created, representing the null, or empty set prior to any data entry.

The system changes value of 'u' to u+W, so that u=1

The system checks whether 'u'>'d', which in this case is not (u=1, d=5), after which it checks whether 'u'<'d' (in this case yes), so it deletes all backups from (u+W) through 'd', which in this case <USERNAME>_2_TXT.b through <USERNAME>_5_TXT.b. The system won't have to combine the changes of older backups because all backups from <USERNAME>_2_TXT.b through <USERNAME>_5_TXT.b are to be discarded [since this is the very first change and no undo has been performed at this point, there won't be any backups to discard]

The system saves another backup named <USERNAME>_1_TXT.b>. The content of this backup will be +S (see 206B of FIG. 9*b*).

The system describes the change in the key pair list 214 as [1]::[Typed S]

The system saves the value of variables 'c' and 'u' (in non volatile storage) for later retrieval. This state is depicted in FIG. 9*b*.

The user data is now ready to be saved any time the user issues a save command.

The user display 204 at this point reflects the character 'S' on the user's work area.

Referring now to the flow of FIG. 2*a* (Checking whether an undo operation is allowed, based on the state of FIG. 9*b*):

The system checks whether value of 'u' and 'c' are equal, which after the first change are not (u=1 and c=0)

It then checks whether backup corresponding to u−W exists, which in this case does (<USERNAME>_0_TXT.b)

Undo operation is thus allowed, which is depicted in FIG. 9b by the undo button 210 now in an enabled state, as indicated by the bolder button text and underlined characters in the undo button.

FIG. 2b: Performing an undo operation if undo operation is allowed (determined in figure #)

If the user issues an undo request, the system checks whether undo is allowed, which in this case, is allowed, based on the flow depicted in FIG. 2a The system changes the value of u to u−W, so that u=0

The system incorporates all changes from previous backups into (<USERNAME>_0_TXT.b before it is made current or restored (in this case there are no previous backups). The backup corresponding to the value of 'u' (<USERNAME>_0_TXT.b) is restored or made current, which in this case is just a blank file The system saves the new value of 'u' for later retrieval.

Figure 9C:
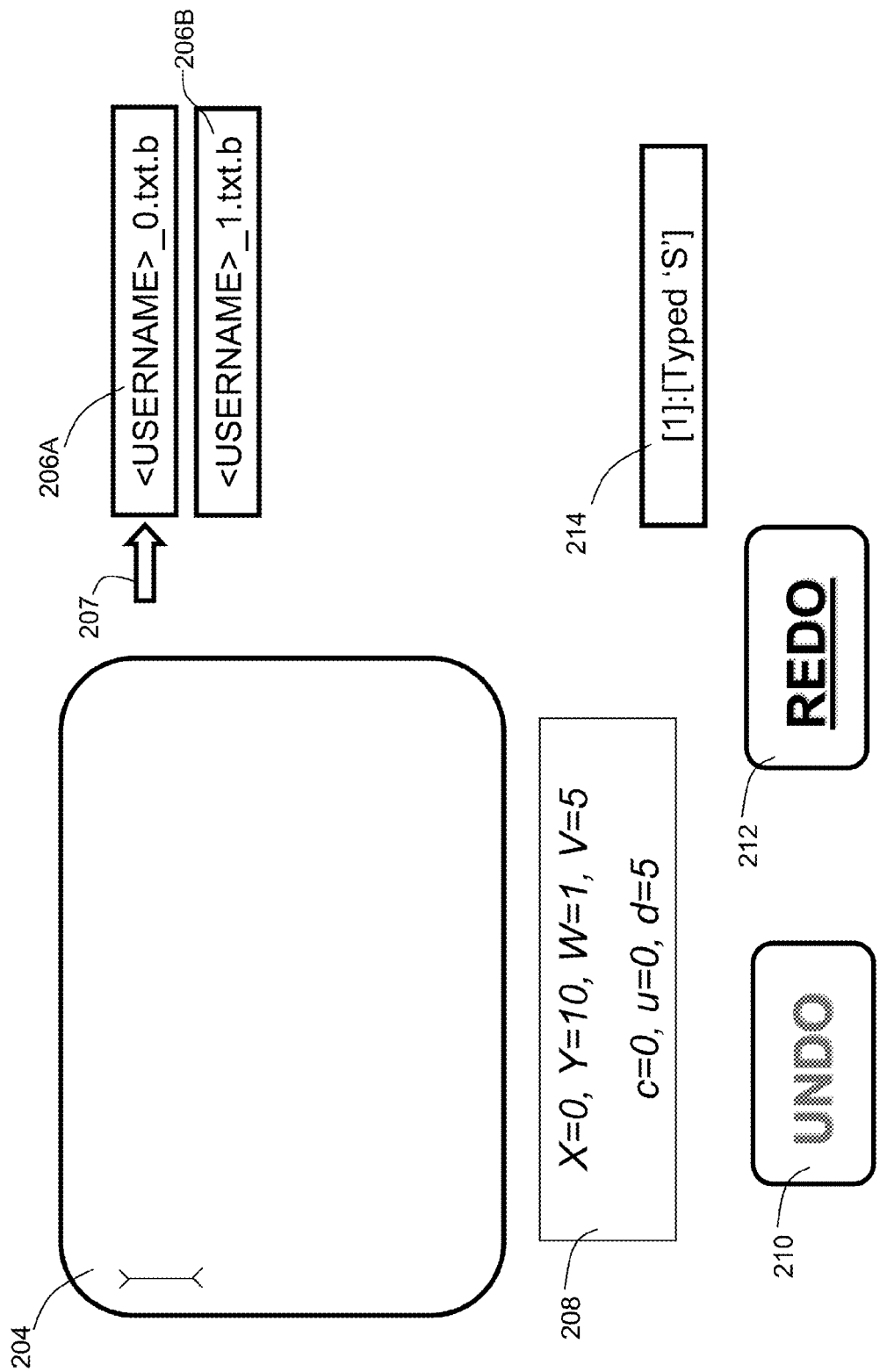

The user display 204 at this point reflects that the user's work areas is blank since the change made by the user (of typing the first character) has been undone. This is depicted in FIG. 9c.

Referring now to the flow of FIG. 4a (Checking whether a redo operation is allowed): Consider the scenario where the user has already performed one undo operation, as depicted in FIG. 9c.

To determine if redo operations are allowed, the system checks whether value of 'u' and 'd' are equal, which after the first change are not (u=0 and d=5)

It then checks whether backup corresponding to u+W exists, which in this case does (<USERNAME>_1_TXT.b)

Redo operation is thus allowed, as depicted by the enabled state of redo button 212.

Referring now to the flow depicted in FIG. 4b (Performing a redo operation if redo operation is allowed (determined in FIG. 4a):

If the user issues a redo request, the system checks whether redo is allowed, which in this case, is allowed, based on the flow depicted in FIG. 4a The system changes the value of u to u+W, so that u=1

In an embodiment where the system is only saving changes as backups, it will combine all previous changes before restoring a backup which in this case is just one +S. The backup corresponding to the value of 'u' (<USERNAME>_1_TXT.b) is restored or made current The system saves the new value of 'u' for later retrieval.

Figure 9D:
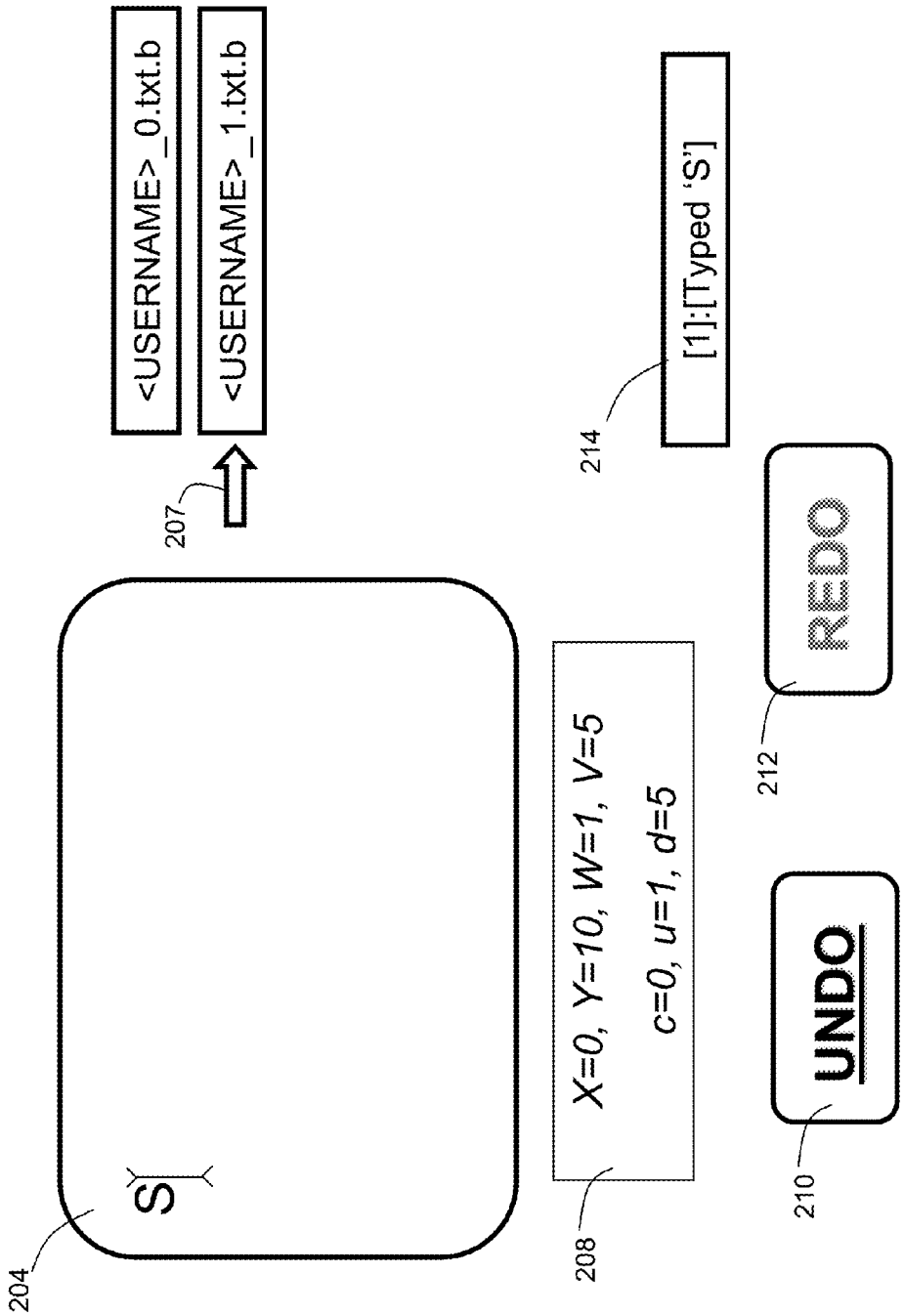

The user display at this point should reflect the character 'S' on the user's work area since the undone change by the user has been redone. This state is depicted in FIG. 9d.

Figure 9E:
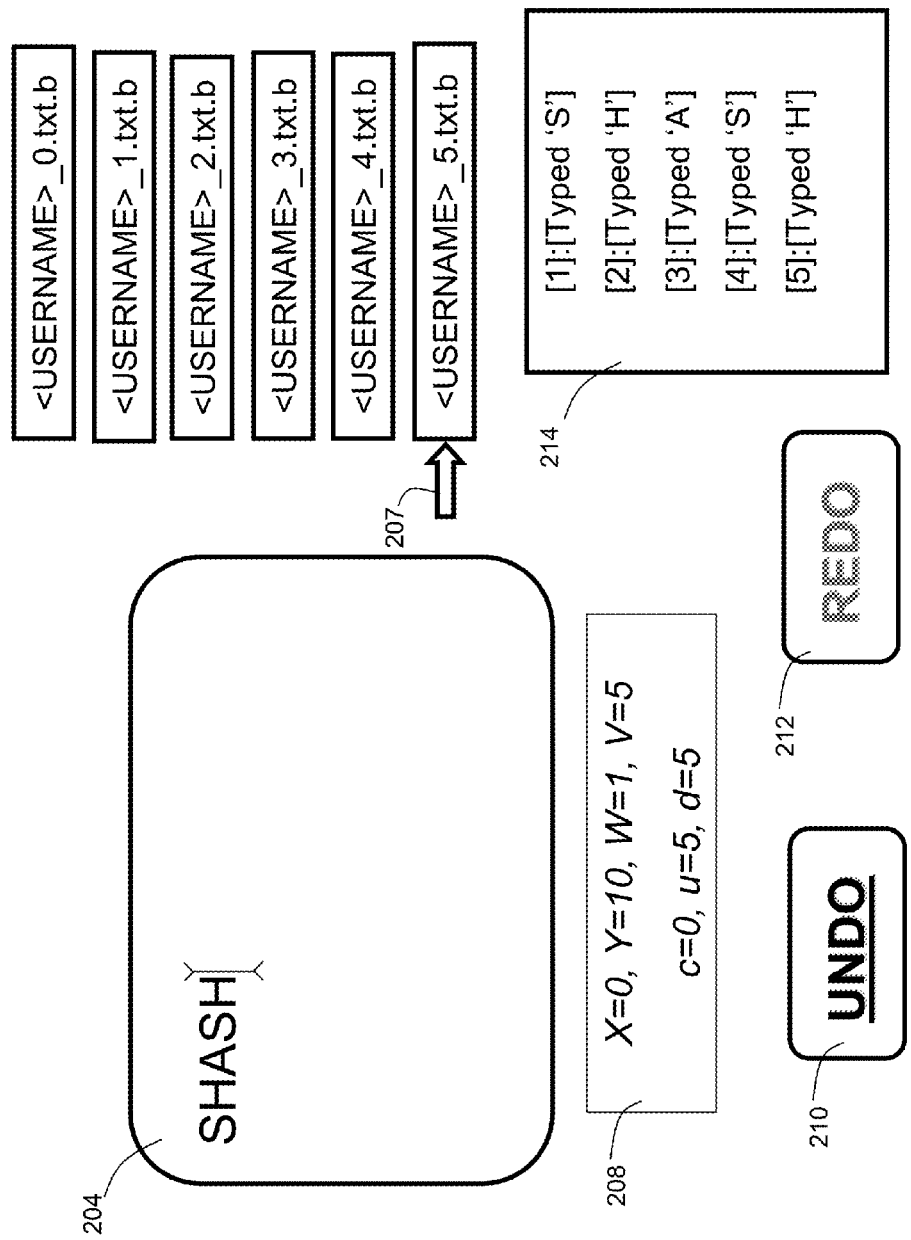

(V+W)th Change:

The user display before the (V+W)th change should reflect the characters 'SHASH' on the display. This is depicted in FIG. 9e. The next change is the sixth change, which will be beyond the number of times the user can undo all of the changes they did (based on the setting of the constant V=5 in this example). The values of different variables before this changes are as follows:
  c=0
  u=5
  d=5

The following backups will already exist before the sixth change:
  <USERNAME>_0_TXT.b containing nothing
  <USERNAME>_1_TXT.b containing text +S
  <USERNAME>_2_TXT.b containing text +H
  <USERNAME>_3_TXT.b containing text +A
  <USERNAME>_4_TXT.b containing text +S
  <USERNAME>_5_TXT.b containing text +H The description list 214 now has the following entries:
[1]::[Typed S]
[2]::[Typed H]
[3]::[Typed A]
[4]::[Typed S]
[5]::[Typed H]

Figure 9F:
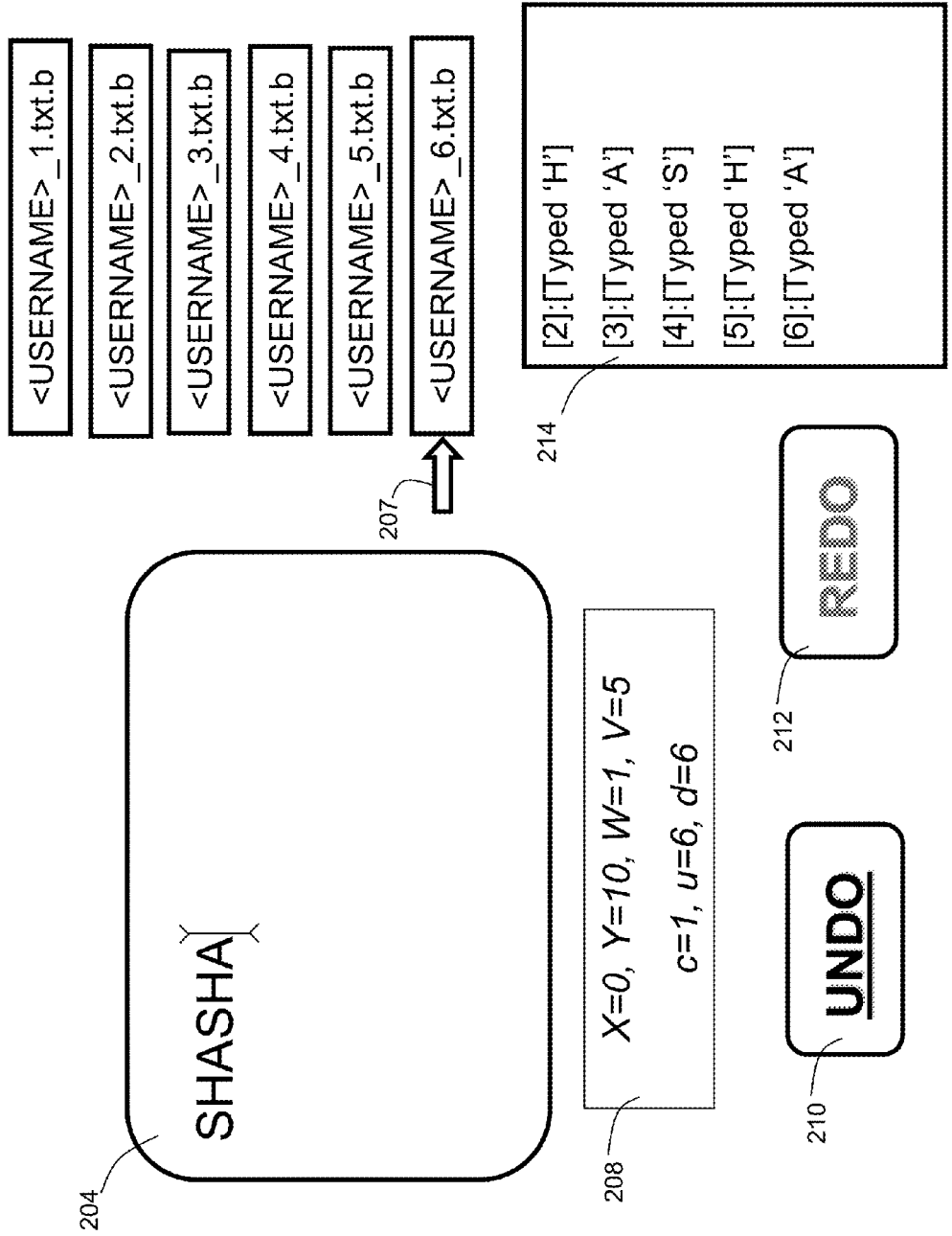

When the user types the sixth letter 'A' in the system (as depicted in FIG. 9f), the system checks whether 'u' is equal to Y, which in this case is not true (u=5, Y=10).

The system checks whether the backup file <USERNAME>_5_TXT.b exists, which in this case does, so it skips saving a backup It changes value of 'u' to u+W, so that u=6

It checks whether 'u'>'d', which in this case is true (u=6, d=5), therefore it has to delete the backup corresponding to value of 'c' which in this case is <USERNAME>_0_TXT.b, but before deleting this backup, it will update the next backup <USERNAME>_1_TXT.b to incorporate changes from <USERNAME>_0_TXT.b so that <USERNAME>_1_TXT.b will say +S in an embodiment where the system is only saving changes (and not the entirety of data). After this combine operation, it will delete the backup <USERNAME>_0_TXT.b. It is also made sure that the modified date of <USERNAME>_1_TXT.b is not changed since it is being used for information purposes It changes the value of 'c' to c+W, so that c=1

It deletes the entry corresponding to the new value of 'c' so the entry [1]::[Typed S] is removed from the descriptions list 214

It changes the value of 'd' to d+W, so that d=6

The system saves a backup named <USERNAME>_6_TXT.b which will contain the text +A The system describes the change in the list as [6]::[Typed A]

The system saves the value of variables 'c' and 'u' (in non volatile (persistent) storage) for later retrieval The user data is now ready to be saved when/if the user issues a save command The user display at this point should reflect the characters 'SHASHA' on the user's display 204, as shown in FIG. 9f The system next executes the flow depicted in FIG. 2a (Checking whether an undo operation is allowed):

The system checks whether value of 'u' and 'c' are equal, which are not (u=6 and c=1)

It then checks whether backup corresponding to u−W exists, which in this case does (<USERNAME>_5_TXT.b)

Undo operation is thus allowed, as indicated by the state of undo button 210 in FIG. 9f.

If the user issues an undo request, the system checks whether undo is allowed, which in this case, is from FIG. 2a The system changes the value of u to u−W, so that u=5

Figure 9G:
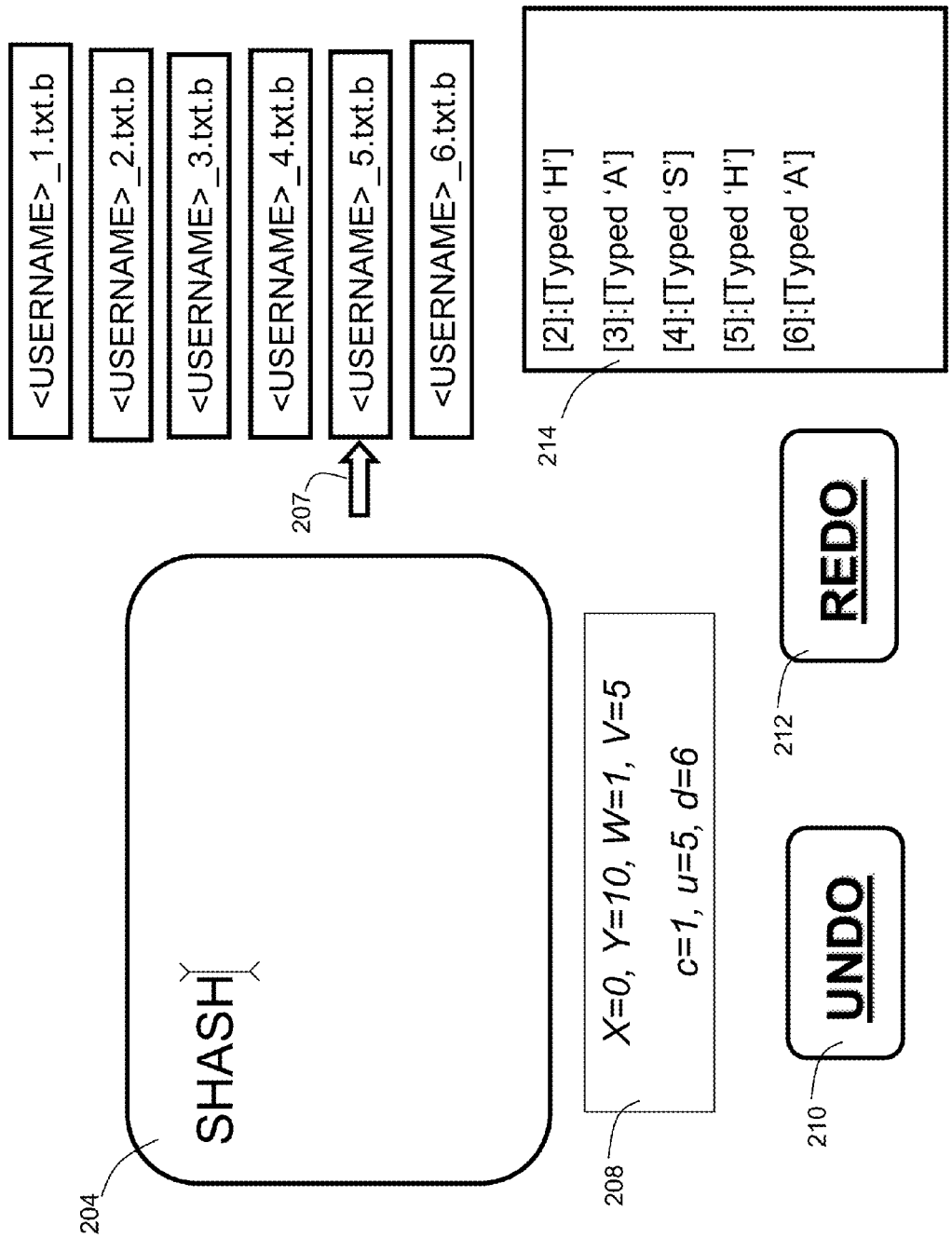

In embodiments where the system is only saving changes, it combines all previous changes up to and including <USERNAME>_5_TXT.b (which will be +S+H+A+S+H) and backup corresponding to the value of 'u' (<USERNAME>_5_TXT.b) is restored or made current, as indicated by the arrow 207 pointing to that file in FIG. 9g.

The system saves the new value of 'u' for later retrieval.

The display 204 at this point reflects the characters 'SHASH' on the user's work area since the change made by the user has been undone.

The system next executes the flow depicted in FIG. 4a (Checking whether a redo operation is allowed):

Consider the scenario where the user has already performed one undo operation

The system checks whether value of 'u' and 'd' are equal, which are not (u=5 and d=6, as shown in FIG. 9g)

It then checks whether backup corresponding to u+W exists, which in this case does (<USERNAME>_6_TXT.b)

Redo operation is thus allowed, as indicated by the state of redo button 212 in FIG. 9g If the user issues a redo request, the system checks whether redo is allowed, which in this case, is allowed, based on the flow depicted in FIG. 4a The system changes the value of u to u+W, so that u=6

In embodiments where the system is only saving changes, it combines all changes up to and including <USERNAME>_6_TXT.b (which will be +S+H+A+S+H+A) and the backup corresponding to the value of 'u' (<USERNAME>_6_TXT.b) is restored or made current, as depicted in FIG. 9f.

The system saves the new value of 'u' for later retrieval.

The display 204 at this point reflects the characters 'SHASHA' on the user's work area since the undone change by the user has been redone. This is depicted in FIG. 9f.

Figure 9H:
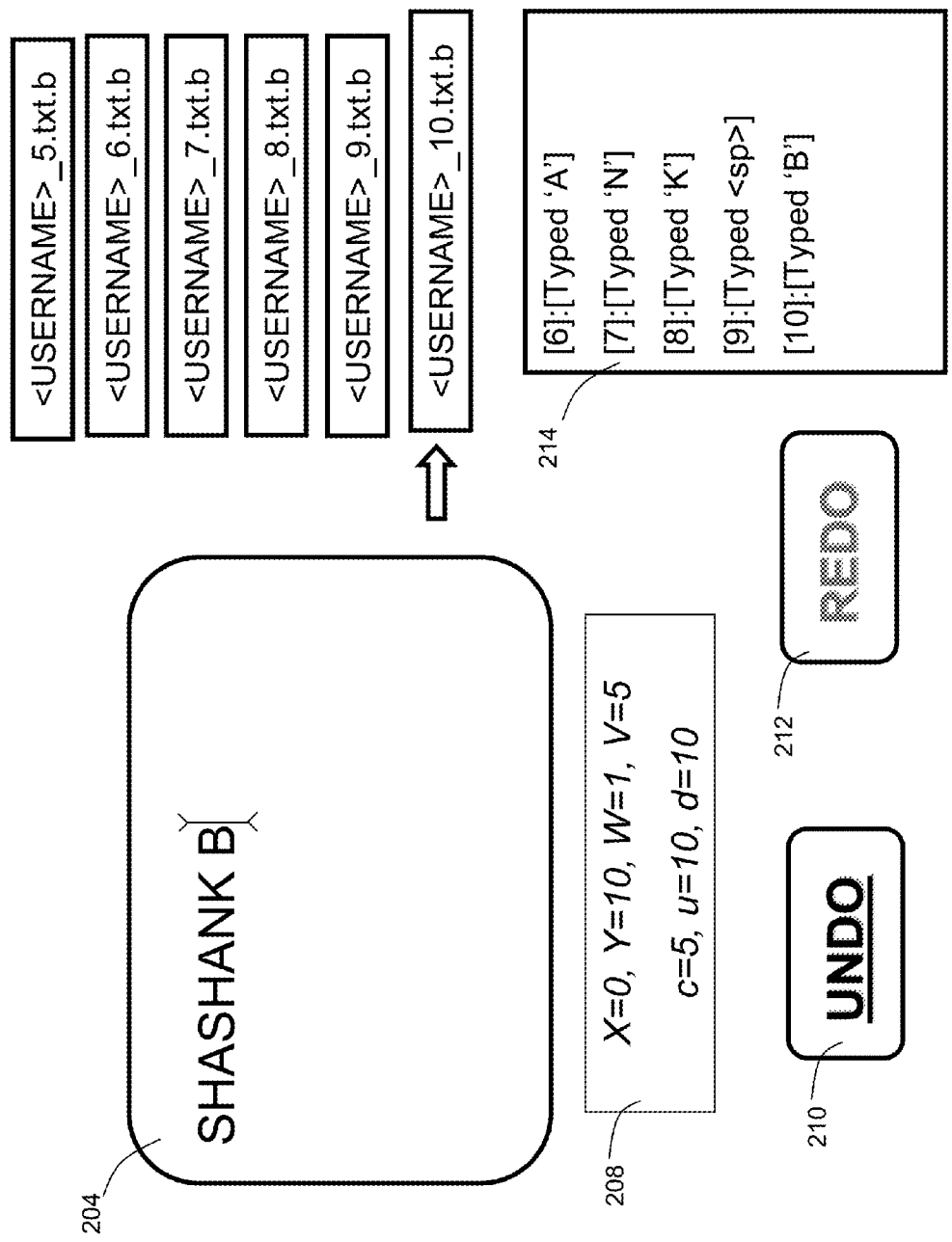

(Y+W)th Change:

The user display before the (Y+W)th change reflects the characters 'SHASHANK B' on the user's work area, as depicted in FIG. 9h. The next (eleventh) change will be beyond the maximum allowed value of 'u' (which is Y). The values of different variables before this change are as follows:

c=5
    u=10
    d=10

The following backup files already exist before the eleventh change:

<USERNAME>_5_TXT.b containing text +S+H+A+S+H
        <USERNAME>_6_TXT.b containing text +A
        <USERNAME>_7_TXT.b containing text +N
        <USERNAME>_8_TXT.b containing text +K
        <USERNAME>_9_TXT.b containing text +<space character>
        <USERNAME>_10_TXT.b containing text +B The key pair description list 214 has following entries:
    [6]::[Typed A]
    [7]::[Typed N]
    [8]::[Typed K]
    [9]::[Typed SPACE]
    [10]::[Typed B]

Referring now to the flow depicted in FIG. 1 (Saving backups while recording changes to the data):

When the user types the eleventh letter 'H' in the system, the system checks whether 'u' is equal to Y, which in this case is true (u=10, Y=10).

The system then resets the value of variable 'd' to (V×W)+X, so that d=5

All backups corresponding to c, c+W . . . Y−W, Y are renamed to X, X+W . . . d−W, d. The backups in this case are in the form of files so to list these in proper order we will use the modified date/time, therefore, it is made sure that the modified date/times are not changed during this reset to make sure backups will be listed from newest to oldest. So that <USERNAME>_5_TXT.b containing text +S+H+A+S+H
        <USERNAME>_6_TXT.b containing text +A
        <USERNAME>_7_TXT.b containing text +N
        <USERNAME>_8_TXT.b containing text +K
        <USERNAME>_9_TXT.b containing text +<space character>
        <USERNAME>_10_TXT.b containing text +B Will be renamed respectively to
        <USERNAME>_0_TXT.b containing text +S+H+A+S+H
        <USRERNAME>_1_TXT.b containing text +A
        <USERNAME>_2_TXT.b containing text +N
        <USERNAME>_3_TXT.b containing text +K
        <USERNAME>_4_TXT.b containing text +<space character>
        <USERNAME>_5_TXT.b containing text +B And the modified date/time of the newly renamed <USERNAME>_0_TXT.b, <USERNAME>_1_TXT.b, <USERNAME>_2_TXT.b, <USERNAME>_3_TXT.b, <USERNAME>_4_TXT.b, <USERNAME>_5_TXT.b are the same as the originally named files of <USERNAME>_5_TXT.b, <USERNAME>_6_TXT.b, <USERNAME>_7_TXT.b, <USERNAME>_8_TXT.b, <USERNAME>_9_TXT.b, <USERNAME>_10_TXT.b respectively. The new names for backups are calculated by subtracting c and adding X. So in this case <USERNAME>_5_TXT.b will be renamed to <USERNAME>_0_TXT.b because c is 5 and X is 0 and so on.

The description list 214 is also updated (the keys are updated) to reflect the change so that it becomes
    [1]::[Typed A]
    [2]::[Typed N]
    [3]::[Typed K]
    [4]::[Typed SPACE]
    [5]::[Typed B]

The system then sets the value of variable 'u' to 'd', so that u=5

It then sets the value of variable 'c' to X, so that c=0

The system checks whether the backup file <USERNAME>_5_TXT.b exists, which in this case does, so it skips saving a backup It changes value of 'u' to u+W, so that u=6

It checks whether 'u'>'d' (in this case is true), therefore it has to delete the backup corresponding to value of 'c' which in this case is <USERNAME>_0_TXT.b. In embodiments where the system is only saving changes, it updates the next backup <USERNAME>_1_TXT.b to incorporate the changes from <USERNAME>_0_TXT.b so that <USERNAME>_1_TXT.b has contents +S+H+A+S+H+A It changes the value of 'c' to c+W, so that c=1

It deletes the entry corresponding to the new value of 'c' so the entry [1]::[Typed A] is removed from the descriptions list It changes the value of 'd' to d+W, so that d=6

The system saves backup named <USERNAME>_6_TXT.b containing text +H

The system describes the change in the list as [6]::[Typed H]

The system saves the value of variables 'c' and 'u' (in non volatile memory) for later retrieval. This state is depicted in FIG. 9i.

The user data is now ready to be saved if the user issues a save command

Figure 9I:
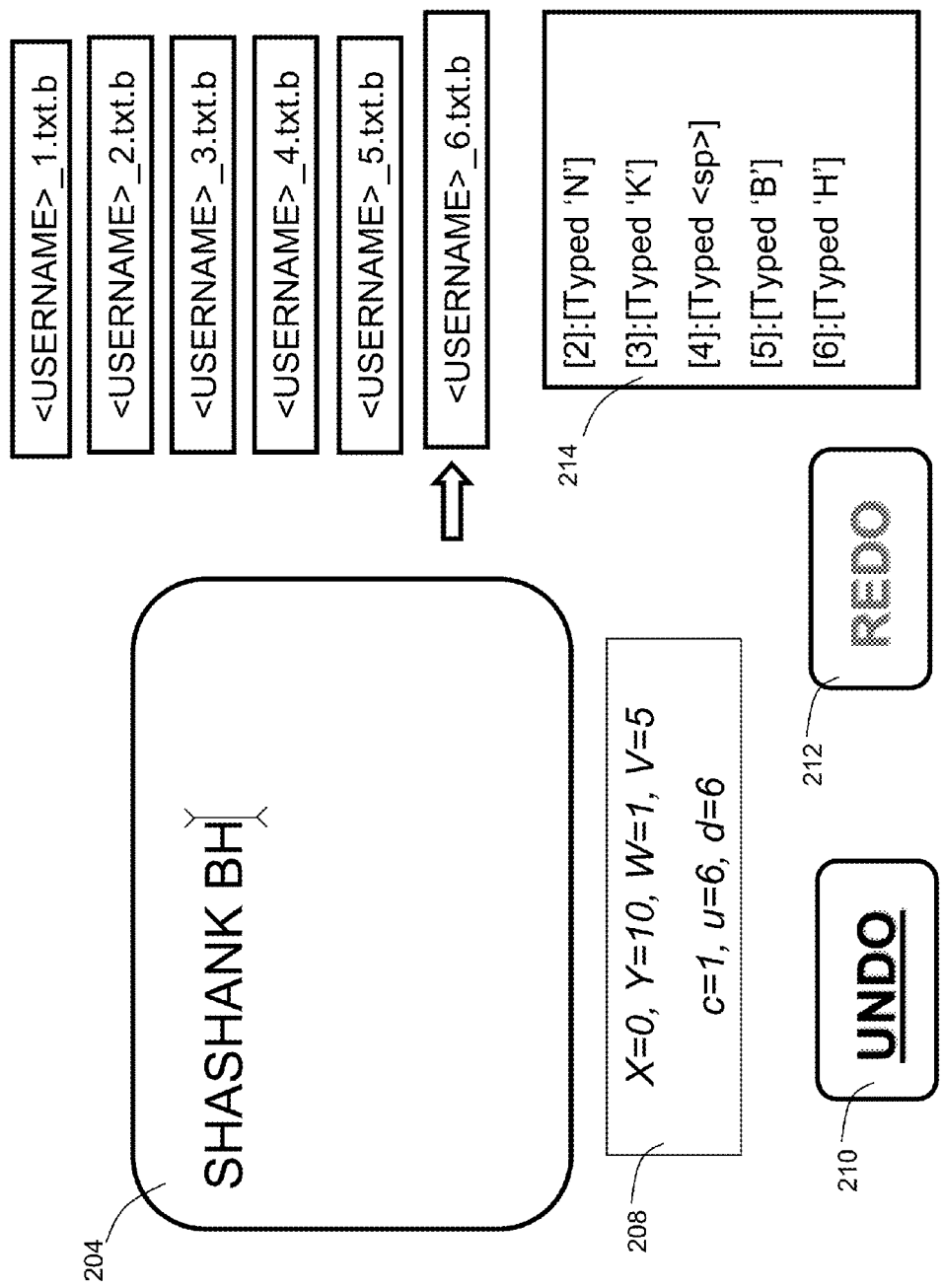

The user display at this point should reflect the characters 'SHASHANK BH' on the user's work area, as shown in FIG. 9i.

Referring now to the flow of FIG. 2a (Checking whether an undo operation is allowed):

The steps taken for this check will be exactly identical as described in the FIG. 2a section of the (V+W)th operation, and the undo operation is allowed, as indicated by the state of the button text of undo button 210.

Figure 9J:
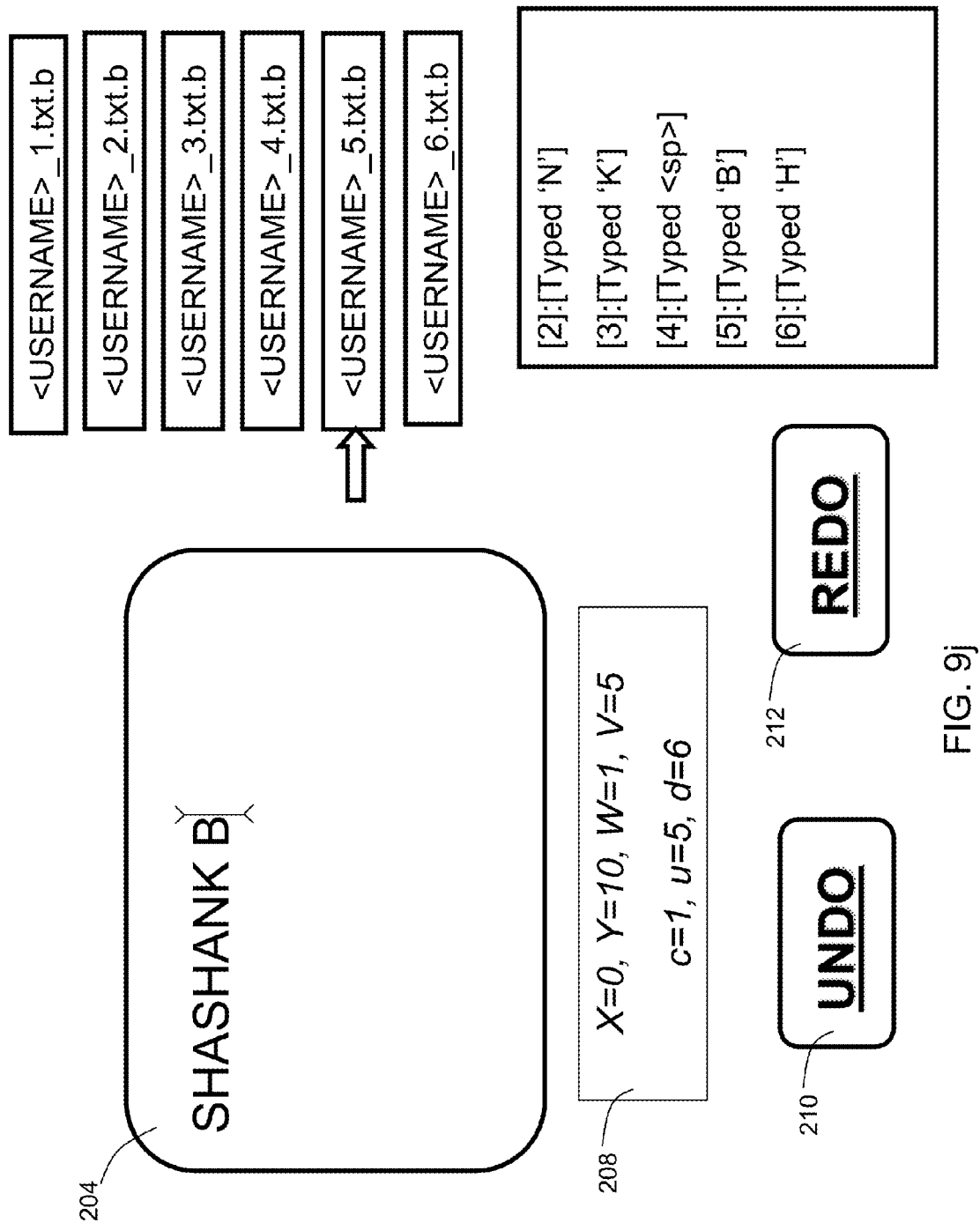

If the user performs an undo operation at this point, then:

The steps taken for this check will be similar to those as described in the FIG. 2b section of the (V+W)th operation except after combining all backups up to and including <USERNAME>_5_TXT.b, the current data set should say +S+H+A+S+H+A+N+K++B The user display 204 at this point shows the characters 'SHASHANK B' on the user's work area since the change made by the user has been undone. This is depicted in FIG. 9j.

Referring now to the flow depicted in FIG. 4a (Checking whether a redo operation is allowed):

Consider the scenario where the user has already performed one undo operation

The steps taken for this check will be exactly identical as described in the FIG. 4a section of the (V+W)th operation If the user performs a redo operation at this point, then:

The steps taken for this check will be similar to as described in the FIG. 4b section of the (V+W)th operation except after combining all backups up to and including <USERNAME>_6_TXT.b, the current data set should say +S+H+A+S+H+A+N+K++B+H The user display 204 at this point reflects the characters 'SHASHANK BH' on the user's work area since the undone change by the user has been redone. This state is depicted in FIG. 9i.

Multiple Undo/Redo operations:

For this example assume that the current value of u is 6 just after the (Y+W)th change as described above and shown in FIG. 9i. The screen at this point shows the following text 'SHASHANK BH'. At this state checking the whether undo/redo operations can be performed as depicted in FIG. 2a of the diagrams:

Referring now to the flow depicted in FIG. 2a (Checking whether an undo operation is allowed):

The system checks whether value of 'u' and 'c' are equal, which are not (u=6 and c=1)

It then checks whether backup corresponding to u−W exists which in this case does (<USERNAME>_5_TXT.b) since u−W=6−1=5.

Undo operation is thus allowed as indicated by the state of the undo button 210 in FIG. 9i.

Referring now to the flow depicted in FIG. 4a (Checking whether a redo operation is allowed):

The system checks whether value of 'u' and 'd' are equal, which are equals (u=6 and d=6)

Redo operation is disallowed as indicated by the state of the redo button 212 in FIG. 9i (redo button 212 has grayed out text, not underlined).

After the first undo operation, both undo and redo operations will be allowed until after the fifth undo is performed. Let's consider five consecutive undo operations are performed from the state shown in FIG. 9i. After the five undo operations, the values of different variables are: u=1, c=1, d=6 and the screen shows the text 'SHASHA' as depicted in FIG. 9k.

Referring now to the flow depicted in FIG. 2a (Checking whether an undo operation is allowed):

The system checks whether value of 'u' and 'c' are equal, which are equal (u=1 and c=1)

Figure 9K:
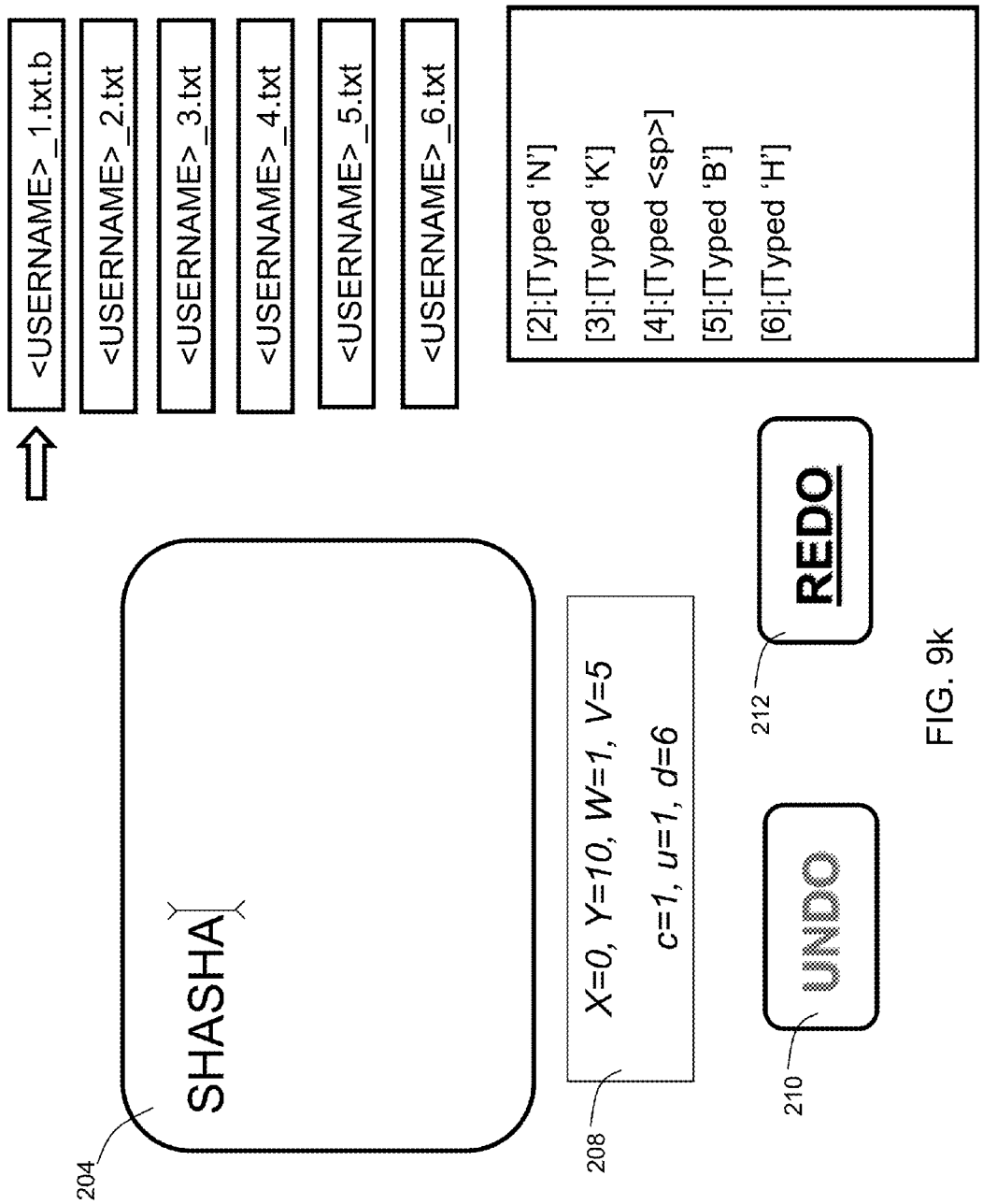

Undo operation is not allowed as indicated by the state of the undo button 210 in FIG. 9k.

Referring now to the flow depicted in FIG. 4a (Checking whether a redo operation is allowed):

The system checks whether value of 'u' and 'd' are equal, which are not (u=1 and d=6)

It then checks whether backup corresponding to u+W exists, which in this case does (<USERNAME>_2_TXT.b)

Redo operation is thus allowed as indicated by the state of the redo button 211 in FIG. 9k.

Figure 9L:
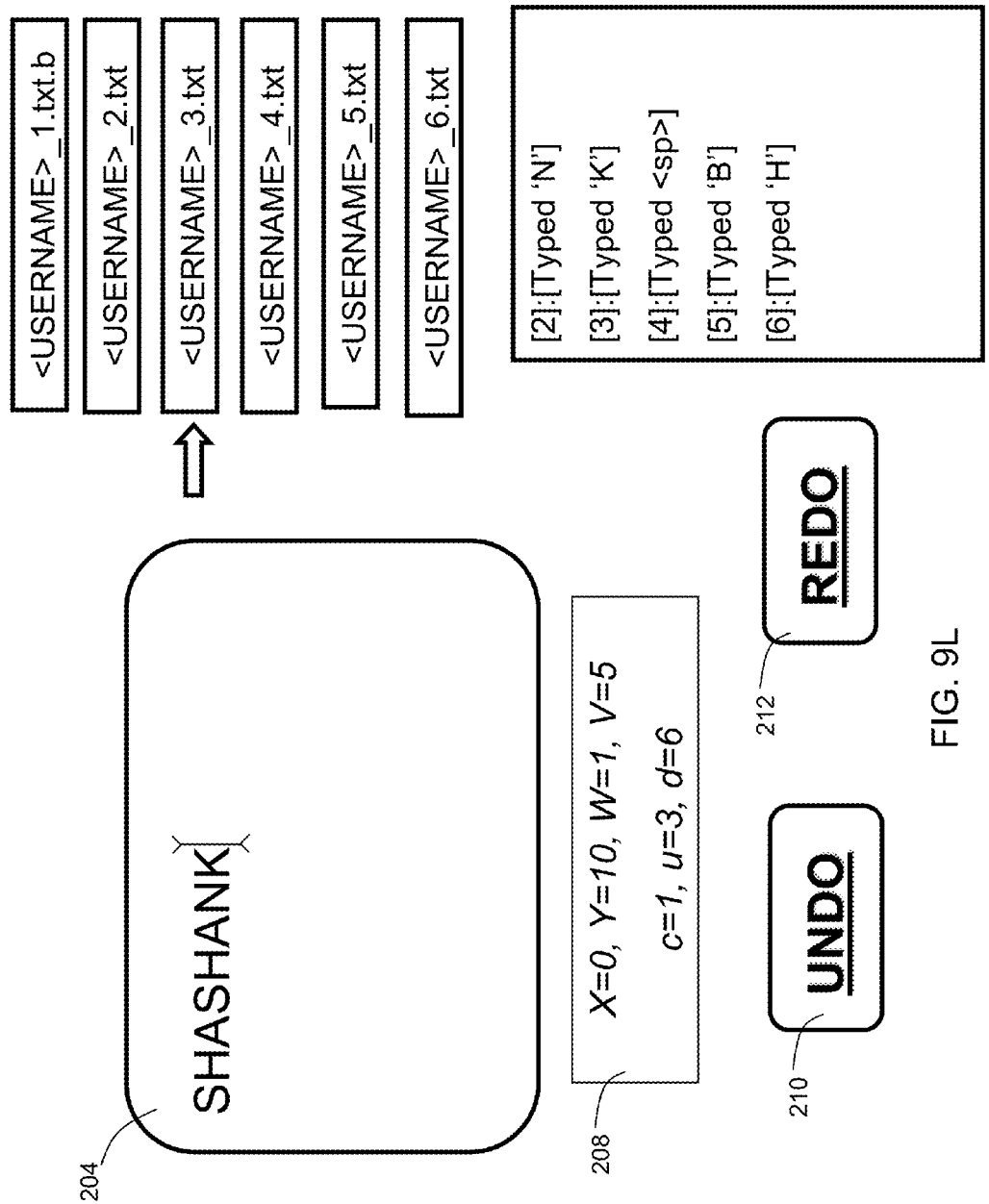

At this state 5 redo operations can be performed to get back the text 'SHASHANK BH' back on the screen Overwriting Changes:

For this example, assume that the current value of u is 6 just after the (Y+W)th change as described above. The screen at this point shows the following text 'SHASHANK BH'. At this state 5 undo operations can be performed and no redo operation can be performed as described in the 'Multiple Undo/Redo operations' section and depicted in FIG. 9i. Let's now assume 3 undo operations are performed so that the text on the screen shows 'SHASHANK'. After this, there are 2 undo operations available and 3 redo available and the values of different variables are u=3, c=1, d=6. This state is depicted in FIG. 9L. If now, the user types a new character '!', let's look at what happens according to FIG. 1a-1d:

When the user types the new character '!' in the system, the system checks whether 'u' is equal to Y, which in this case is not true (u=3 and Y=10).

The system checks whether the backup file <USERNAME>_3_TXT.b exists, which in this case does exist, so it skips saving a backup It changes value of 'u' to u+W, so that u=4

Figure 9M:
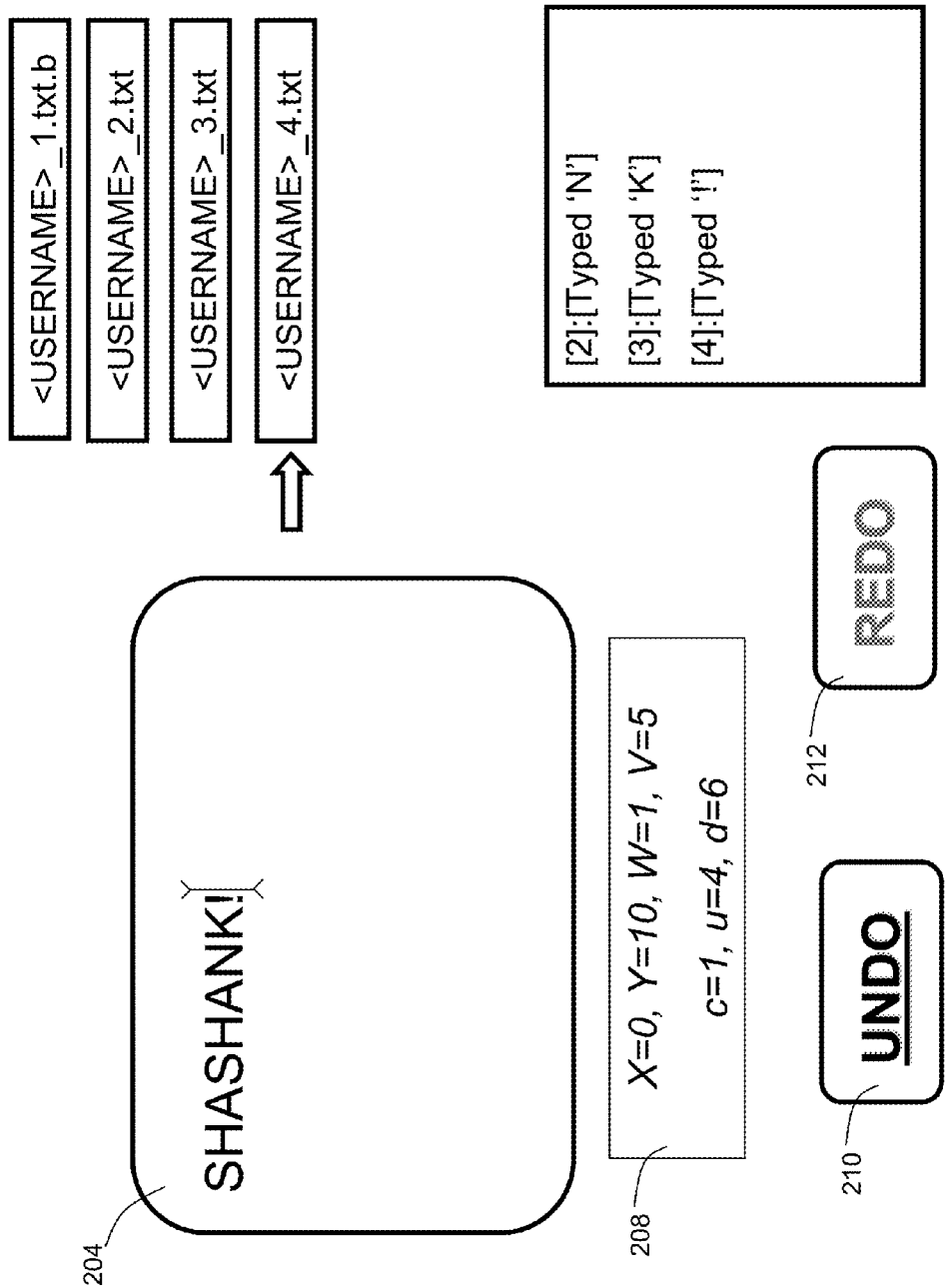

It checks whether 'u'>'d' (in this case is not), after which it checks whether 'u'<'d' (in this case yes), so it deletes all backups from (u+W) through 'd', which in this case <USERNAME>_5_TXT.b through <USERNAME>_6_TXT.b. The system won't have to combine the changes of older backups because all backups from <USERNAME>_5_TXT.b through <USERNAME>_6_TXT.b are to be discarded. The collection of description is updated to remove these values The system saves another backup named <USERNAME>_4_TXT.b containing text +! overwriting the existing backup with the same name from before The system describes the change in the list as [4]::[Typed !] overwriting [4]::[Typed SPACE] from before. This state is depicted in FIG. 9m.

The system saves the value of variables 'c' and 'u' (in non volatile (persistent) memory) for later retrieval After this change, the values are u=4, c=1, d=6 and only 3 undo operations are allowed and no redo operations are allowed because the previous changes that type ' BH' are lost.

The above described methodology provides several exemplary steps for enabling a user to write/save the record of the changes done to user data so that previous states of this data are available and can be accessed and restored by undoing or redoing these changes at any time in the future regardless of the state of the concerned software application or the machine. As such, the above noted methods and/or corresponding illustrations are provided to illustrate but one possible avenue of achieving the inventive concepts described herein. Accordingly, any number of modifications can be apparent to those of skill in the art, without deviating from the teachings of the present invention.

What is claimed is:

1. A method of performing a persistent change operation to user data, comprising:
    establishing a current index value for user data;
    establishing a undo limit value;
    establishing a redo limit value;
    establishing an increment/decrement value;
    receiving a request to modify user data;
    saving a backup copy of the user data corresponding to the current index value;
    applying the request to modify user data to create a modified copy of the user data;
    saving the modified copy of the user data;
    incrementing the current index value by the increment/decrement value to create a new current index value; and
    saving a backup copy of the user data corresponding to the new current index value.

2. The method of claim 1, further comprising:
    receiving an undo request; and,
    processing the undo request if:
        the current index value is unequal to the undo limit value; and
        a backup copy of the user data corresponding to a value of the current index value minus the increment/decrement value exists.

3. The method of claim 1, further comprising:
    receiving an undo request; and,
    rejecting the undo request if the current index value is equal to the undo limit value.

4. The method of claim 1, further comprising:
    receiving an undo request; and,
    rejecting the undo request if a backup copy of the user data corresponding to a value of the current index value minus the increment/decrement value does not exist.

5. The method of claim 1, further comprising:
    receiving a redo request; and,
    processing the redo request if:
        the current index value is unequal to the redo limit value; and
        a backup copy of the user data corresponding to a value of the current index value plus the increment/decrement value exists.

6. The method of claim 1, further comprising:
    receiving a redo request; and,
    rejecting the redo request if the current index value is equal to the redo limit value.

7. The method of claim 1, further comprising:
    receiving a redo request; and,
    rejecting the redo request if a backup copy of the user data corresponding to a value of the current index value plus the increment/decrement value does not exist.

8. The method of claim 2, further comprising rendering a preview of the undo request prior to processing the undo request.

9. The method of claim 5, further comprising rendering a preview of the redo request prior to processing the redo request.

10. The method of claim 5, further comprising:
    receiving a request to change the undo limit value and redo limit value; and
    updating the undo limit value and redo limit value based on the received request to change the undo limit value and redo limit value.

11. A system for performing persistent change operation to user data, comprising:
    a memory configured and disposed to store machine instructions;
    a processor configured and disposed to access the memory;
    a user interface device configured and disposed to receive user input;
    a display configured and disposed to render the user data;
    wherein the memory contains instructions, which when executed by the processor, perform steps of:
        establishing a current index value for user data;
        establishing a undo limit value;
        establishing a redo limit value;
        establishing an increment/decrement value;
        receiving a request to modify user data;
        saving a backup copy of the user data corresponding to the current index value;
        applying the request to modify user data to create a modified copy of the user data;
        saving the modified copy of the user data;
        incrementing the current index value by the increment/decrement value to create a new current index value; and
        saving a backup copy of the user data corresponding to the new current index value.

12. The system of claim 11, wherein the memory further contains instructions, which when executed by the processor, perform the steps of:
    receiving an undo request; and,
    processing the undo request if:
        the current index value is unequal to the undo limit value; and
        a backup copy of the user data corresponding to a value of the current index value minus the increment/decrement value exists.

13. The system of claim 11, wherein the memory further contains instructions, which when executed by the processor, perform the steps of:
    receiving an undo request; and,
    rejecting the undo request if the current index value is equal to the undo limit value.

14. The system of claim 11, wherein the memory further contains instructions, which when executed by the processor, perform the steps of:
    receiving an undo request; and,
    rejecting the undo request if a backup copy of the user data corresponding to a value of the current index value minus the increment/decrement value does not exist.

15. The system of claim 11, wherein the memory further contains instructions, which when executed by the processor, perform the steps of:
    receiving a redo request; and,
    processing the redo request if:
        the current index value is unequal to the redo limit value; and
        a backup copy of the user data corresponding to a value of the current index value plus the increment/decrement value exists.

16. The system of claim 11, wherein the memory further contains instructions, which when executed by the processor, perform the steps of:
    receiving a redo request; and,
    rejecting the redo request if the current index value is equal to the redo limit value.

17. The system of claim 11, wherein the memory further contains instructions, which when executed by the processor, perform the steps of:

receiving a redo request; and, rejecting the redo request if a backup copy of the user data corresponding to a value of the current index value plus the increment/decrement value does not exist.

18. The system of claim 12, wherein the memory further contains instructions, which when executed by the processor, perform the step of rendering a preview of the undo request prior to processing the undo request.

19. The system of claim 15, wherein the memory further contains instructions, which when executed by the processor, perform the step of rendering a preview of the redo request prior to processing the redo request.

20. A computer program product embodied in a non-transitory computer readable medium for implementation of an apparatus for performing persistent change operations on user data, comprising instructions for:

establishing a current index value for user data;

establishing a undo limit value;

establishing a redo limit value;

establishing an increment/decrement value;

receiving a request to modify user data;

saving a backup copy of the user data corresponding to the current index value;

applying the request to modify user data;

saving the modified copy of the user data to create a modified copy of the user data;

incrementing the current index value by the increment/decrement value to create a new current index value; and saving a backup copy of the user data corresponding to the new current index value.

21. The computer program product of claim 20, further comprising instructions for rendering a preview of an undo request prior to processing the undo request.

* * * * *